United States Patent [19]

Schultz

[11] Patent Number: 5,587,577
[45] Date of Patent: Dec. 24, 1996

[54] MODULAR SCANNER WITH HAND-HELD DATA TERMINAL

[75] Inventor: Darald R. Schultz, Cedar Rapids, Iowa

[73] Assignee: Norand Corporation, Cedar Rapids, Iowa

[21] Appl. No.: 449,630

[22] Filed: May 24, 1995

Related U.S. Application Data

[63] Continuation of Ser. No. 195,154, Feb. 10, 1994, abandoned, which is a continuation-in-part of Ser. No. 872,717, Apr. 23, 1992, Pat. No. 5,305,181, which is a continuation-in-part of Ser. No. 364,902, filed as PCT/US90/03283 Jun. 7, 1990, abandoned, and Ser. No. 816,705, Jan. 2, 1992, abandoned, which is a continuation-in-part of Ser. No. 812,767, Dec. 23, 1991, abandoned.

[51] Int. Cl.$^6$ .................................................. G06K 7/10
[52] U.S. Cl. ............................................ 235/472; 235/462
[58] Field of Search ...................................... 235/462, 472

[56] References Cited

U.S. PATENT DOCUMENTS

| | | | |
|---|---|---|---|
| 4,261,042 | 4/1981 | Ishiwatari | 364/709 |
| 4,766,299 | 10/1988 | Tierney et al. | 235/472 |
| 4,930,848 | 6/1990 | Knowles | 235/472 |
| 4,983,818 | 1/1991 | Knowles | 235/472 |
| 5,115,120 | 5/1992 | Eastman | 235/462 |
| 5,191,197 | 3/1993 | Metlitsky et al. | 235/472 |
| 5,227,614 | 7/1993 | Danielson et al. | 235/380 |
| 5,250,790 | 10/1993 | Metlitsky et al. | 235/472 |
| 5,272,324 | 12/1993 | Blevins | 235/472 |
| 5,305,181 | 4/1994 | Schultz | 361/680 |
| 5,340,972 | 8/1994 | Sandor | 235/472 |

FOREIGN PATENT DOCUMENTS

| | | | |
|---|---|---|---|
| 204056 | 10/1985 | Japan | 364/708 |
| 3-226887 | 10/1991 | Japan | 235/462 |
| 4-233089 | 8/1992 | Japan | 235/472 |
| 579798 | 9/1976 | Switzerland | 364/708 |

OTHER PUBLICATIONS

Ludeman, et al., Wrist Worn Terminal, IBM Technical Disclosure Bulletin, vol. 15, No. 11, Apr. 1973, pp. 3350–3351.

Primary Examiner—John Shepperd

[57] ABSTRACT

A hand held body for receiving, storing and transmitting information having a keyboard in the top thereof for manually entering information therein. A display is disposed on the top of such body for displaying information which has either been manually entered or scanned in or received from a base radio transceiver. A radio frequency transceiver is also disposed in the hand held body for receiving and transmitting information between the hand held body and the base radio transceiver. A scanner is provided for optically reading information and transmitting such information. A modular housing is provided for holding the scanner and a mechanism is provided for selectively attaching or detaching the housing to a bottom portion of the hand held body whereby the external portions of hand held body in the housing when attached together are small enough to be received in a shirt pocket, whereby the user can store the apparatus in such shirt pocket when not in use. A wrist, arm and finger mounted terminal/scanner, as well as wearable belt or vest mounted battery packs and other components are shown.

102 Claims, 18 Drawing Sheets

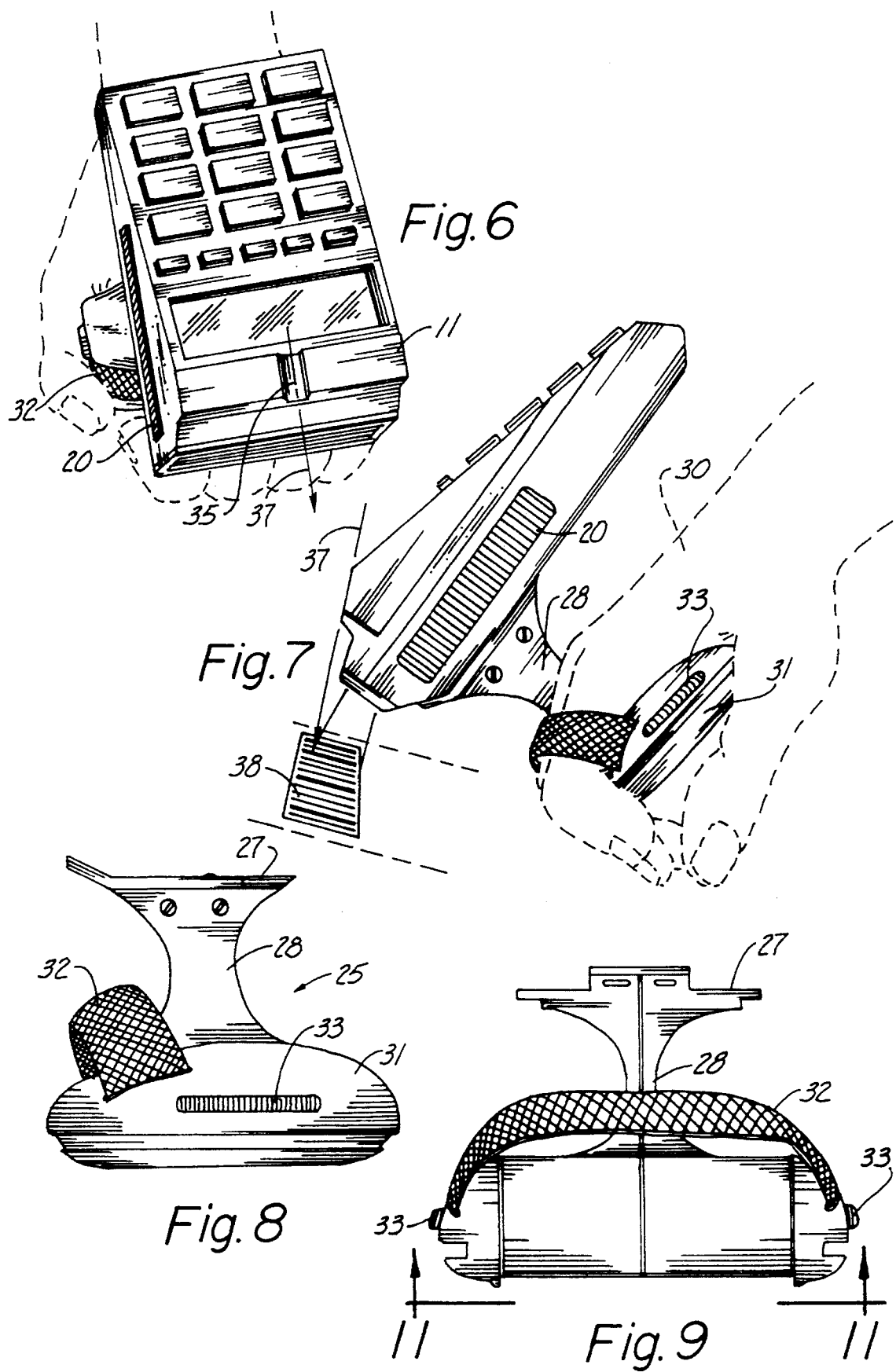

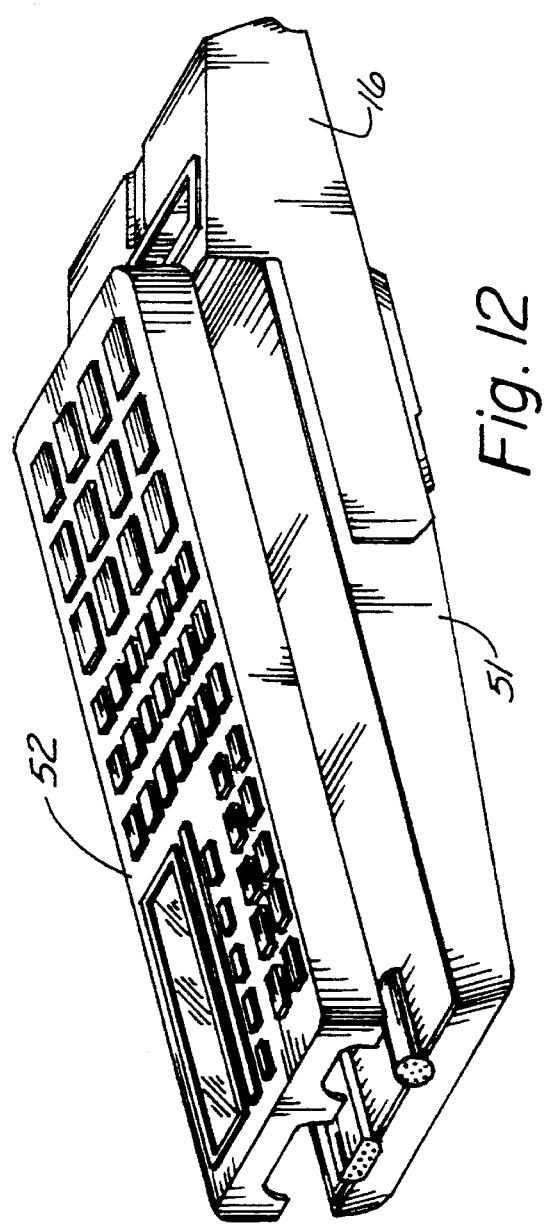
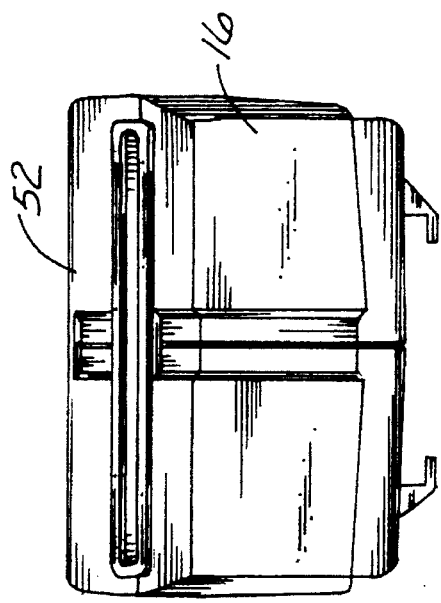
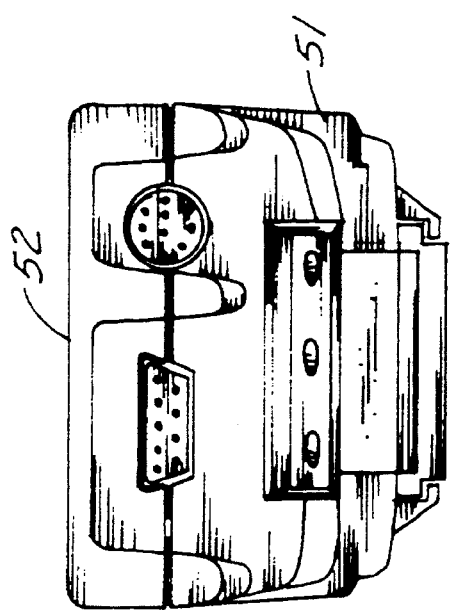

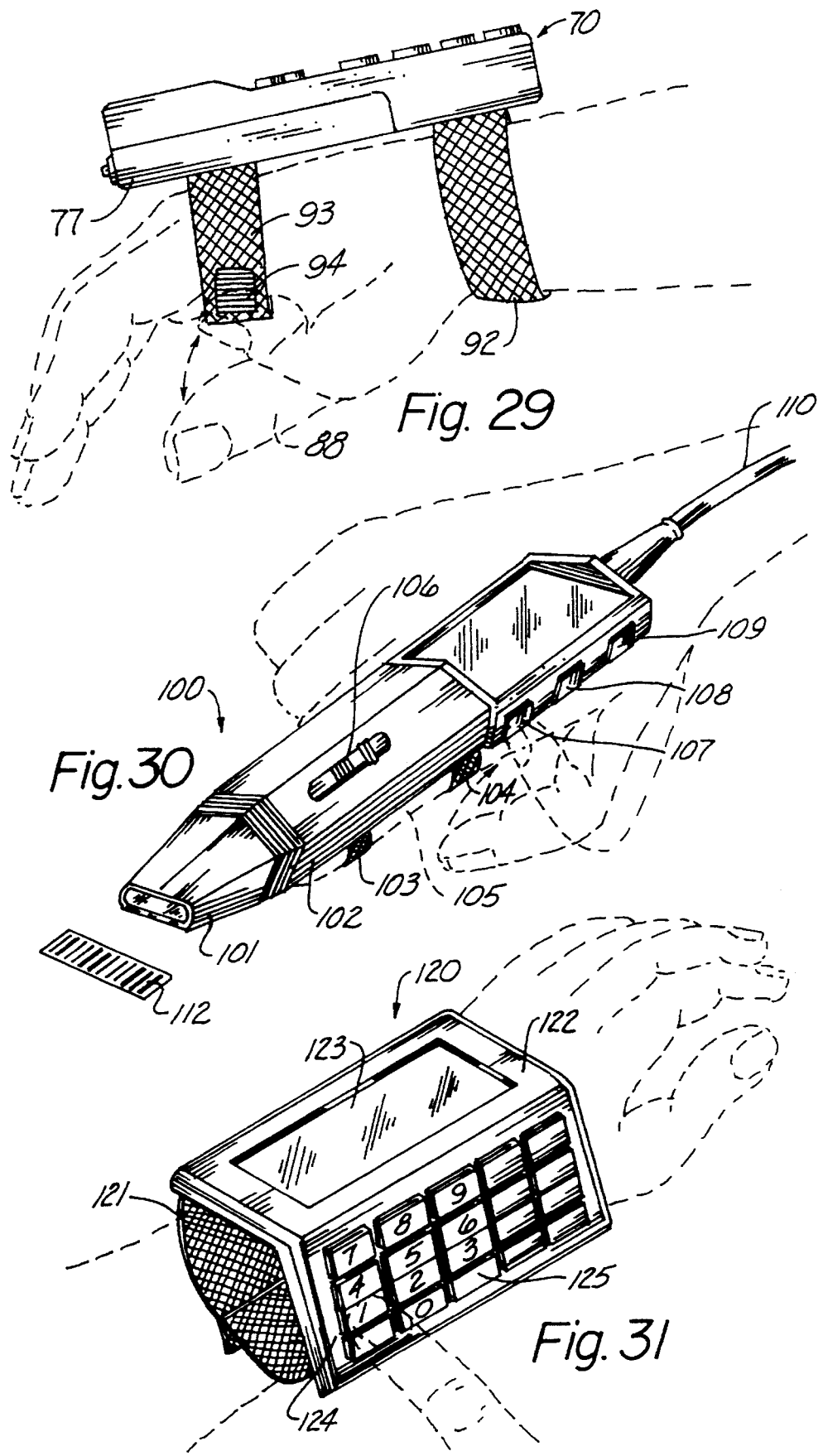

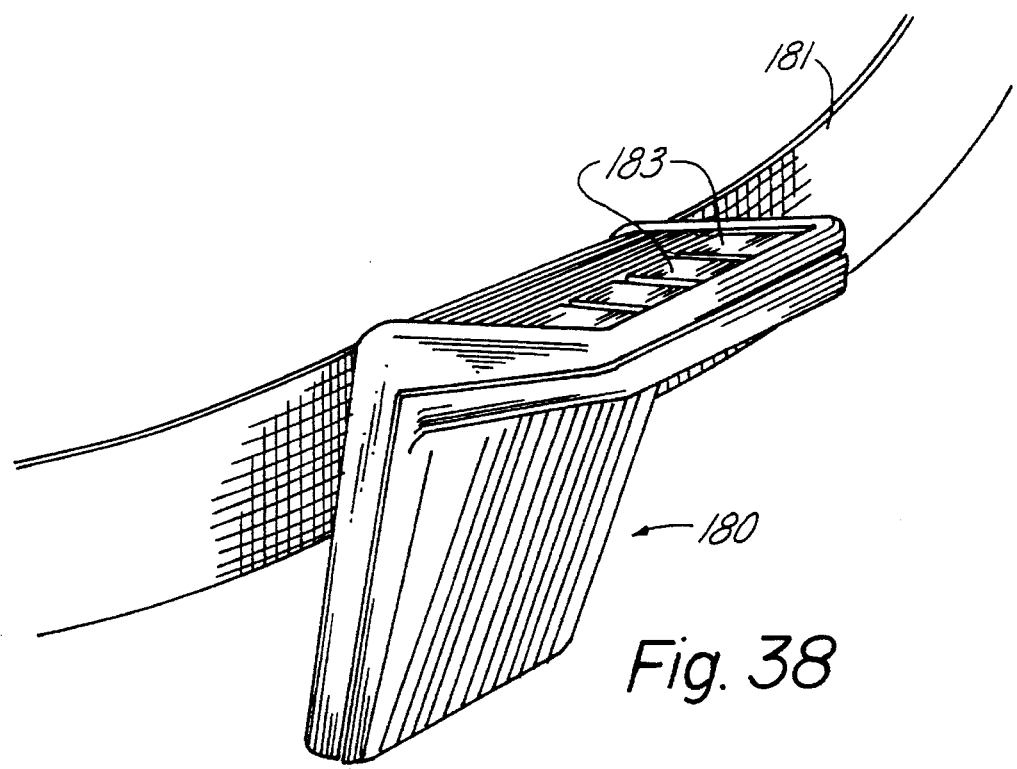
Fig. 38
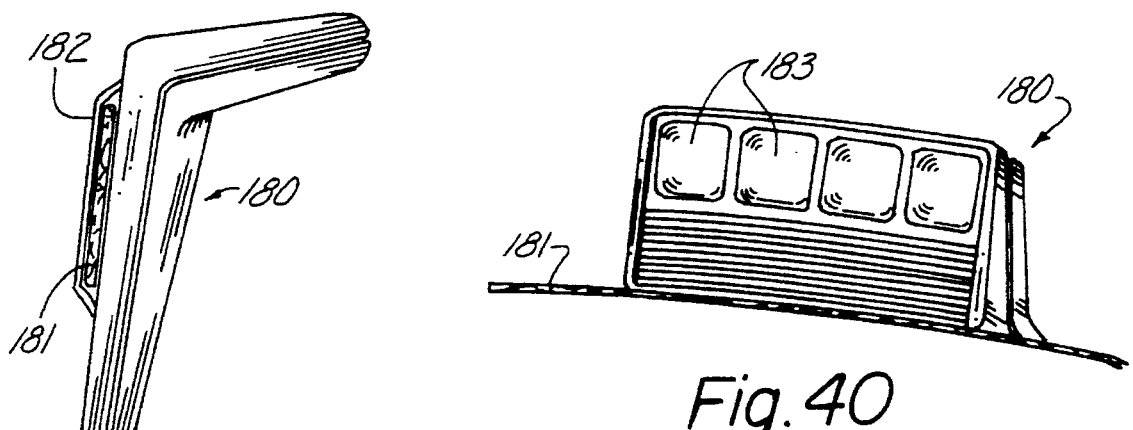
Fig. 39
Fig. 40

MODULAR SCANNER WITH HAND-HELD DATA TERMINAL

CROSS REFERENCE TO RELATED APPLICATIONS (Claiming Benefit Under 35 U.S.C. 120)

This application is a continuation of Application Ser. No. 08/195,154, Attorney Docket No. 37941AB, filed Feb. 10, 1994; which is a continuation-in-part of Application No. 07/872,717, Attorney Docket No. 37941AA, filed Apr. 23, 1992 (now U.S. Pat. No. 5,305,181, issued Apr. 19, 1994); which is a continuation-in-part of Application Ser. No. 07/816,705. Attorney Docket No. 37941A, filed Jan. 2, 1992; which is a continuation-in-part of Application Ser. No. 07/812,767, Attorney Docket No. 37941S, filed Dec. 23, 1991 (now abandoned); and said application Ser. No. 07/872,717 filed Apr. 23, 1992 now U.S. Pat. No. 5,305,181 being also a continuation-in-part of PCT application PCT/US90/03282, with an international filing date of Jun. 7, 1990, and which entered the U.S.A. national phase as application Ser. No. 07/777,393 with a 102e date of Jan. 7, 1992 (now U.S. Pat. No. 5,410,141, issued Apr. 25, 1995); and the PCT application being a continuation-in-part of application Ser. No. 07/364,902, Attorney Docket No. 6767, filed Jun. 8, 1989 (now abandoned).

INCORPORATION BY REFERENCE

The following is incorporated herein by reference:

The descriptive matter of the above-referred to PCT application PCT/US90/03282, filed Jun. 7, 1990, as published under International Publication No. WO 90/16033 on 27 Dec., 1990; U.S. Ser. No. 364,902 filed Jun. 8, 1989; Ser. No. 07/674,756 filed Mar. 25, 1991 Schultz et al.; U.S. Ser. No. 07/812,767, filed Dec. 23, 1991, "MODULAR SCANNER WITH HAND-HELD DATA TERMINAL" in the name of Darald R. Schultz, Attorney Docket No. DN 37941-S; U.S. Ser. Nos. 07/364,594 filed Jun. 7, 1989 and 07/364,904 filed Jun. 8, 1989, both entitled "HAND-HELD DATA CAPTURE SYSTEM WITH INTERCHANGEABLEMODULES" in the names of Darald R. Schultz et al (USA National Phase of PCT/US90/03282), Attorney Docket No. 36767X PCT USA National Phase; U.S. Ser. No. 07/674,756 filed Mar. 25, 1991, in the names of Darald R. Schultz et al.; U.S. Ser. No. 07/660,615 filed Feb. 25, 1991, and now naming Darald R. Schultz as one of the joint inventors; and U.S. Ser. No. 07/816,705, filed Jan. 2, 1992 "MODULAR SCANNER WITH HAND-HELD DATA TERMINAL" in the name of Darald R. Schultz et al (DN 37941-A).

Technical Field

The present invention relates generally to a hand held data terminal which will fit into a shirt pocket and which has a modular scanner attached thereto. The present invention also relates to a hand held data terminal which has a flexible housing which can be attached to a user's arm or wrist. It can also be attached to larger hand held data terminals or to a tethered terminal device. The invention also relates to a pedestal grip and docking apparatus associated therewith and to a wrist mounted and a back-of-the-hand mounted terminal and scanner.

Background Art

In the past, hand held data terminals have been available with scanners tethered thereto. These structures typically needed to be held in two hands, with one hand holding the terminal and the other hand holding the scanner. This becomes a problem, especially when it is desired to manually enter information into the terminal. This is because one hand is typically used to hold the terminal and the other hand used to enter information through a keyboard or the like, which would leave the scanner dangling by its tethered cord.

Attempts to combine a scanner into a hand held unit without the tethered attachment have resulted in hand held units which are too large to be held in a shirt pocket or the like. Consequently, there is a need for a terminal having a scanner integrated therein which is small enough to fit into a shirt pocket or the like, or for a terminal and/or scanner which overcomes the aforementioned problems.

DISCLOSURE OF THE INVENTION

The present invention relates generally to a hand held body for receiving, storing and transmitting information having a keyboard in the top thereof for manually entering information therein. A display is disposed on the top of such body for displaying information which has either been manually entered or scanned in or received from a base radio transceiver. A radio frequency transceiver is also disposed in the hand held body for receiving and transmitting information between the hand held body and the base radio transceiver. A scanner is provided for optically reading information and transmitting such information to the hand held body. A housing is provided for holding the scanner and a mechanism is provided for selectively attaching or detaching the housing to a bottom portion of the hand held body whereby the external portions of hand held body in the housing, when attached together, are small enough to be received in a shirt pocket, whereby the user can store the apparatus in such shirt pocket when not in use.

An aiming structure is provided on the body hand or housing for permitting the user to aim the scanner at a bar code or the like.

Because of the small size of the combined body and housing, a grip structure is provided for facilitating easy maneuverability of the combined body and housing for scanning purposes and for docking purposes. A wrist mounted or back-of-the-hand mounted device is also provided for further facilitating the use of such combined body and scanner, including a trigger mechanism which can be operated by the same hand that has the combined body and housing attached thereto. Belt or vest wearable components are also disclosed.

An object of the present invention is to provide an improved hand held data terminal and modular scanner.

Another object of the present invention is to provide a hand held data terminal with a modular scanner which can be stored in a shirt pocket when not in use.

Another object of the present invention is to provide a modular scanner which can be used on a smaller shirt pocket type hand held data terminal or on a larger hand held data terminal.

A still further object of the present invention is to provide a hand gripping apparatus for use in association with a shirt pocket hand held data terminal with modular scanner.

A still further object of the present invention is to provide a docking system for use with a hand held data terminal and scanner in conjunction with a gripping mechanism.

A still further object of the present invention is to provide a hand held data terminal with modular scanner which can be attached to the wrist or the back of a hand and having a trigger for operating the scanner with the same hand on which it is mounted.

Another object is to provide a wrist mounted terminal with the keyboard and/or keys disposed in two separate planes;

A still further object is to provide a terminal mounted on a flexible frame whereby the keys and/or display can flex with regard to each other for the comfort of the user.

A still further object is to put the heaviest part of this computer equipment, such as a battery pack on a belt, vest or the like to produce closer to a hands free or fatigue free operation.

Other objects, advantages, and novel features of the present invention will become apparent from the following detailed description of the invention when considered in conjunction with the accompanying drawings.

BRIEF DESCRIPTION OF THE DRAWINGS

FIG. 6 is a perspective view of the apparatus generally shown in FIG. 1, shown in the process of scanning a bar code;

FIG. 7 is a side elevational view of the apparatus as used in FIG. 6 but showing the process of aiming the device toward a bar code with the gripping device attached thereto;

FIG. 8 is a side elevational view of the gripping device shown in FIG. 7;

FIG. 9 is a front view of the gripping device shown in FIGS. 7 and 8;

FIG. 12 is a perspective view of the modular scanning device shown attached to a larger hand held data terminal having an interchangeable and display apparatus associated therewith;

FIG. 13 is a view of one end of the apparatus in FIG. 12;

FIG. 14 is a view of the other end of such apparatus of FIG. 11;

FIG. 29 shows a cloth strap/Velcro attaching mechanism for attaching a hand held data terminal of FIG. 19 to the back of the user's hand and having a trigger mechanism provided within easy access of the thumb of the same hand onto which the hand held data terminal is attached;

FIG. 30 is a perspective view of a finger mounted scanner and terminal with display and control buttons;

FIG. 31 is a perspective view of a wrist or arm mounted terminal having the display disposed in a different plane than the keyboard.

FIG. 38 is a perspective view of a combined battery pack, computer and radio frequency link device;

FIG. 39 is a side view of the FIG. 38 device;

FIG. 40 is a top view of the FIG. 38 device;

BEST MODES FOR CARRYING OUT THE INVENTION

Figure 1:
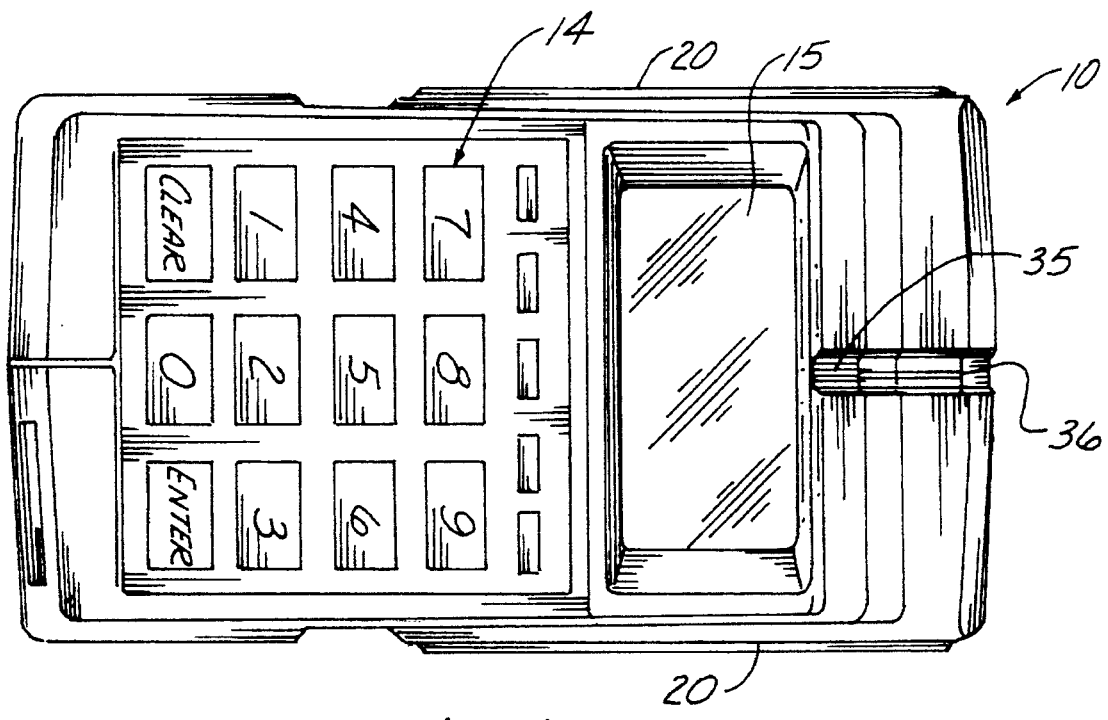
FIG. 1 is a top plan view of a preferred embodiment of the present invention showing a hand held data terminal having a modular scanner attached thereto.
Figure 2:
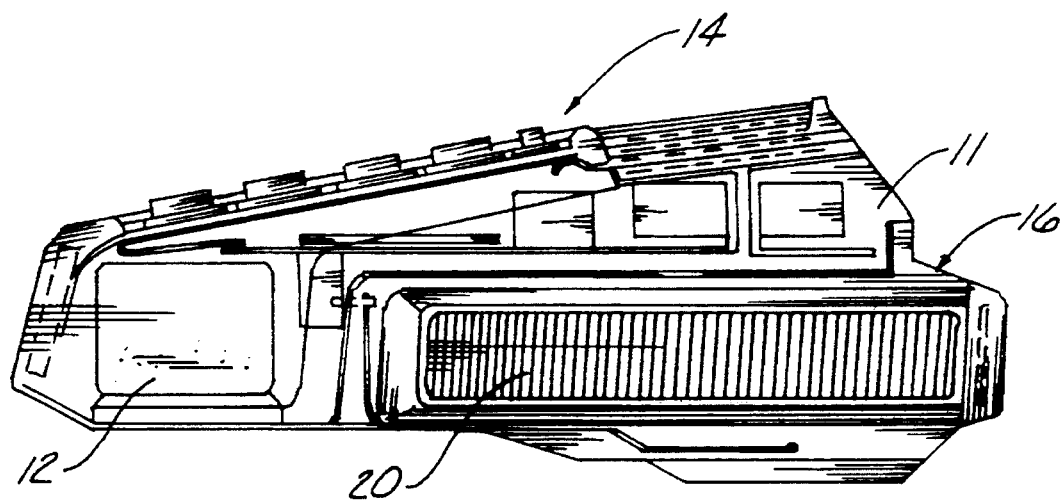
FIG. 2 is a side elevational view of the apparatus of FIG. 1.
Figure 3:
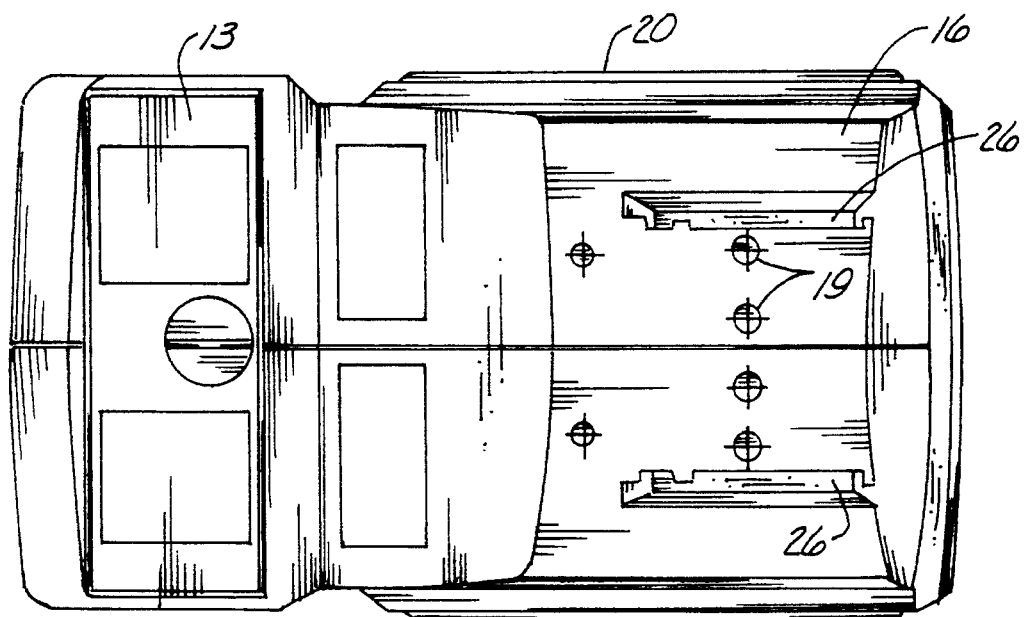
FIG. 3 is a bottom view of the embodiment of FIG. 1.

Referring now to the drawings wherein like reference numerals designate identical or corresponding parts throughout the several views, FIG. 1 shows a hand held data terminal (10) constructed in accordance with the present invention and having a body (11). The body (11) has a battery compartment (12) with a removable battery compartment door (13) as shown in FIG. 3. A keyboard (14) and a display (15) are attached to the body (11) as shown in FIGS. 1 and 2.

Figure 4:
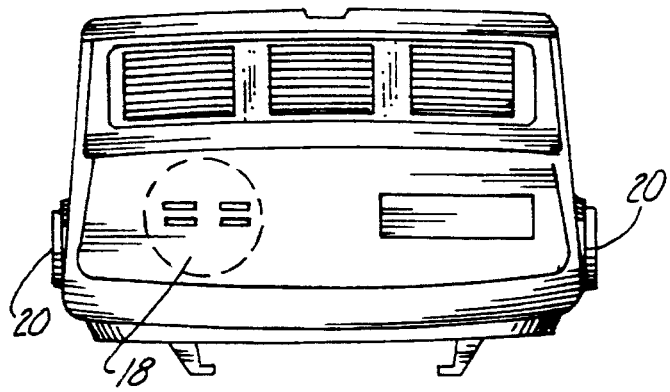
FIG. 4 is a view from one end of the apparatus of FIG. 1.
Figure 5:
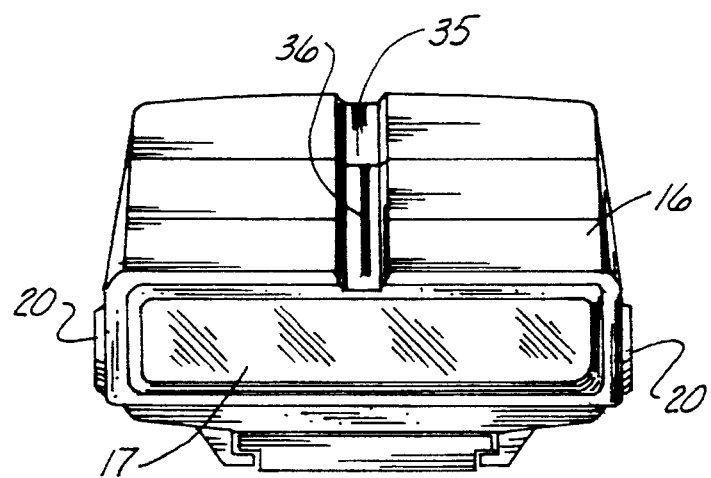
FIG. 5 is a view of the front end of the apparatus of FIG. 1 showing the scanner and aiming device associated therewith.

A modular scanner (16) is provided, which can be of a laser or CCD type. A front laser window (17) is shown in FIG. 5. The housing (11) has a speaker (18), shown in FIG. 4 which can provide an audio signal for various occurrences which can be programmed into the hand held data terminal (10).

Elements (19) on the bottom of the housing (16) of the modular scanner can be either metal contacts for providing electrical contact to recharge the batteries within the battery compartment (12) and/or to communicate information, or they can be optical interfaces for communicating information through optical lines or they can be a combination of metal electrical contacts and optical interfaces.

Triggers (20) on each side of the housing (16) can be utilized to actuate the scanner within housing (16). These triggers (20) are disposed on each side of the housing (16) so that they can be actuated with the thumb of either a right hand user or a left hand user and furthermore, they extend almost the entire length of the housing (16) so that regardless of where the housing (16) is grasped, the thumb of the hand grasping the housing can easily access a trigger (20).

An important novel feature of this embodiment of the present invention is the relatively small size of the body of the hand held terminal (11). The size aspect of this embodiment are discussed in more detail below. Specifically, reference should be made to the discussion of FIGS. 19 and 20.

Referring to FIGS. 6–10, it is noted that a gripping device (25) is shown for attachment to the bottom of housing (16) by flanges (26) integrally attached thereto. Portion (27) on pedestal (28) slides in and under the flanges (26) on housing (16) so that contacts or optical interfaces (29) on member (27) will operably connected with contacts or optical interfaces (19) on the bottom of housing (16). Once the housing (16) and the grip (25) are connected together as is shown in FIG. 7, a hand (30) as shown in FIG. 7 in dashed lines can grasp the base (31) and have the pedestal (28) between the fingers of the hand (30) such that an elastic member (32) will bias the fingers of the hand (30) towards the enlarged portion (31) of the gripping device (25). A secondary trigger (33) is disposed on each side of the enlarged portion (31) of the gripping device (25) and this can also be used to actuate the scanner within the housing (16) instead of actuating the scanner with triggers (20), or, alternatively, the buttons (33) can be used as function buttons to be programmed by the user.

Figure 11:
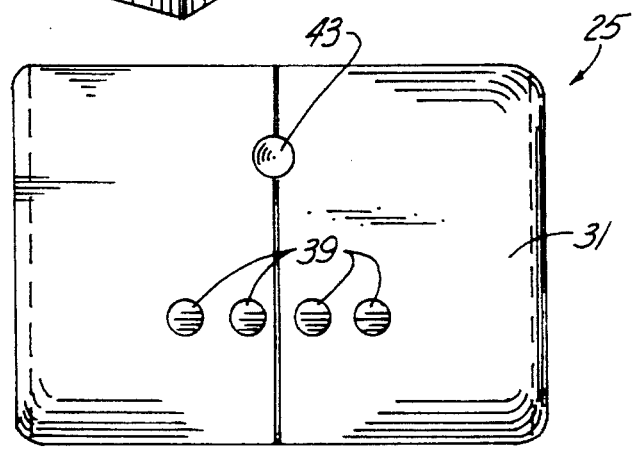
FIG. 11 is a bottom view of the gripping device taken along line 11—11 of FIG. 9.
Figure 15:
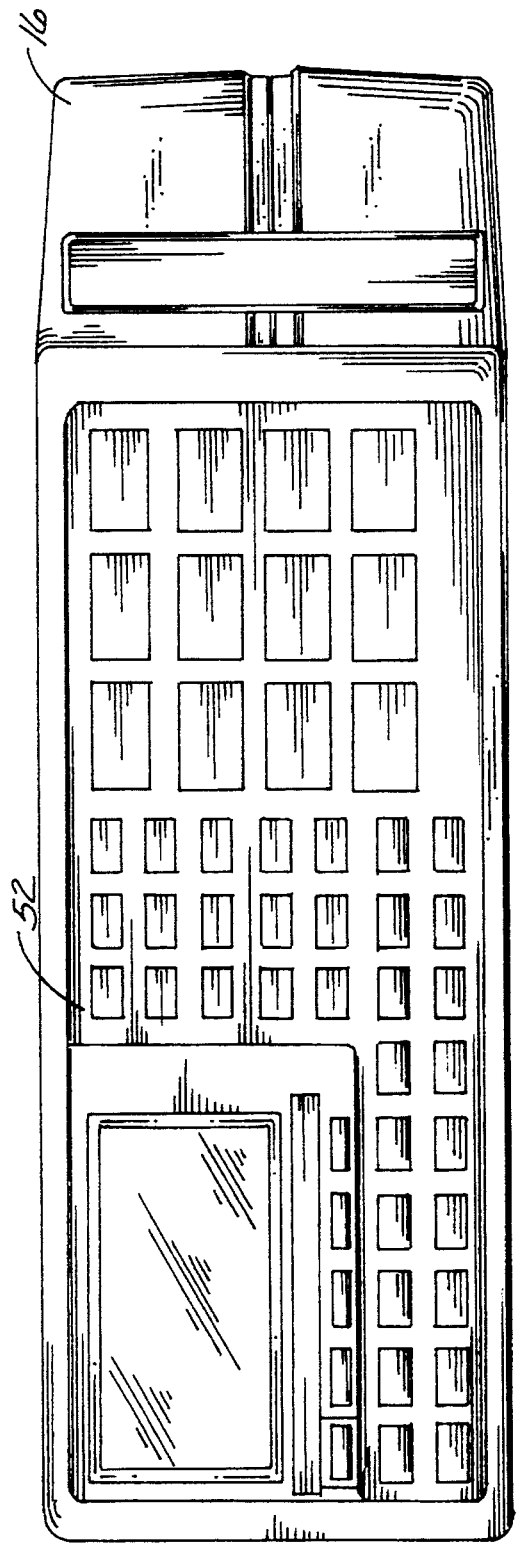
FIG. 15 is a top plan view of the hand held data terminal of FIG. 12, having the modular scanner of the present invention attached thereto.
Figure 16:
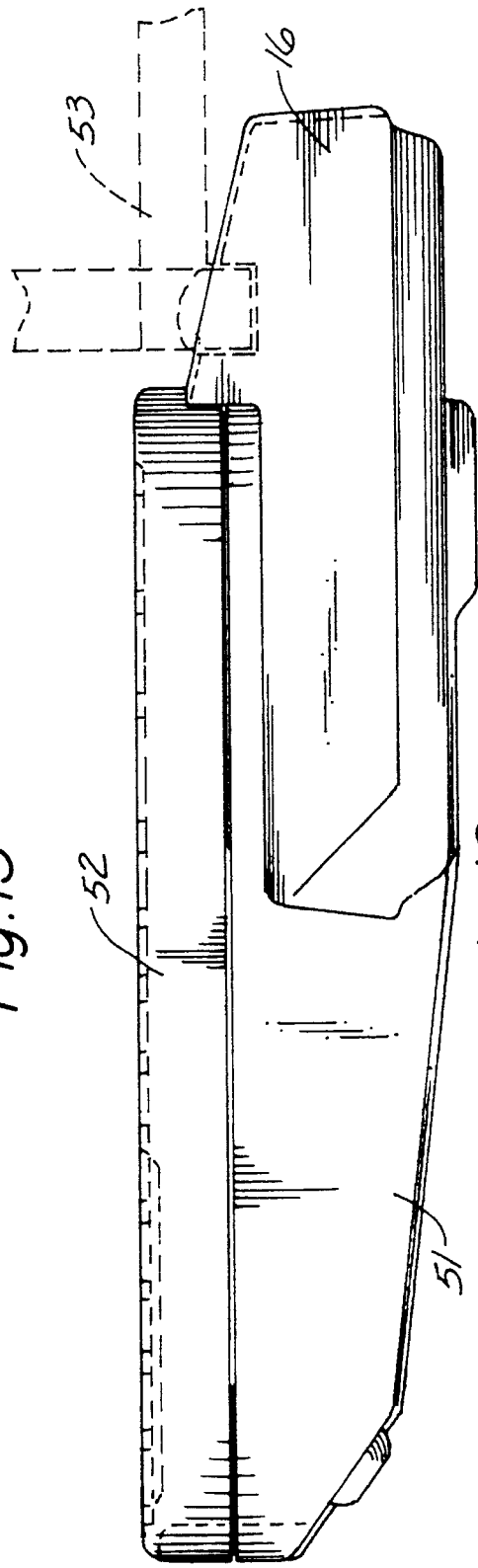
FIG. 16 is a side elevational view of FIG. 14, showing an optional antenna in dashed lines.

FIG. 11 shows the bottom of the gripping device (25) and shows electrical contacts or optical interfaces (39) which are connected directly to respective contacts or optical interfaces (29).

A docking device (40) has contacts for optical interfaces (49) thereon for contacting or interfacing with contacts or interfaces (39) in the bottom of the gripping device (25). Projections (41) on the top of the docking device (40) extend into grooves (42) in the lower portion (31) of gripping device (25) so that the gripping device (25) can be slid into the docking device (40) from either side thereof until the upwardly biased ball bearing (42) extends into the depression (43) in the bottom of the enlarged portion (31) of the gripping member (25). When the gripping device (25) is in such a position, the docking device is capable of charging the battery within the battery compartment (12) and/or transferring information to and from the hand held data terminal (10) and a base computer or the like. Stops (not shown) can also be provided on docking device (40) to permit the gripping device (25) to be attached thereto from only one side, for example, and for it to automatically stop so that the contacts or optical interfaces (39) and (49) are in alignment when the stops are contacted.

Referring to FIGS. 6 and 7, it is noted that a groove (35) is disposed in the top of the body (11), and referring to FIGS. 1 and 5, it is noted that a continuation of the groove (36) is disposed in the housing (16) of the scanning module so that the user can sight down the arrow (37) shown in FIGS. 6 and 7 toward a bar code (38).

Figure 10:
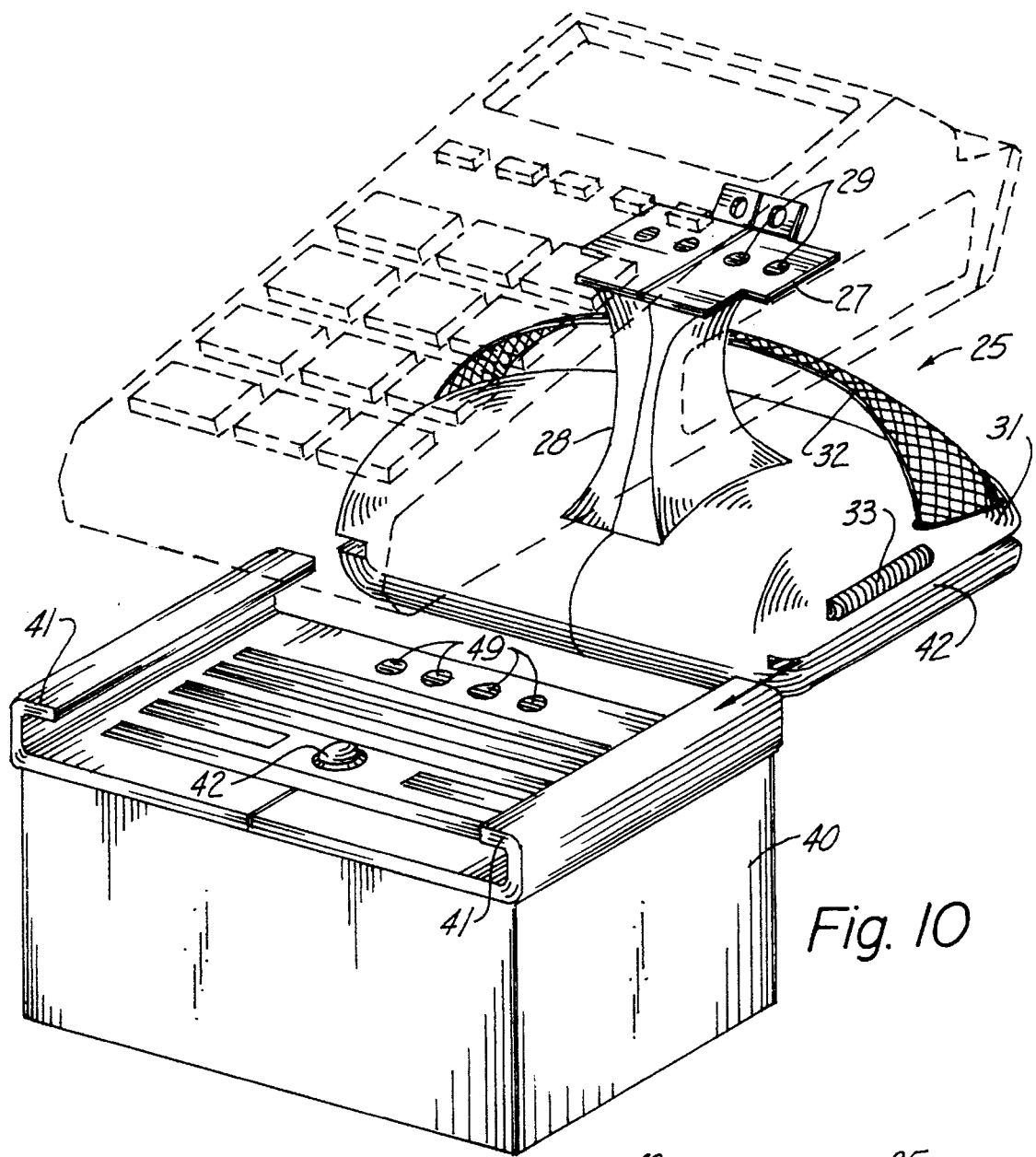
FIG. 10 is a perspective view of the gripping device shown in association with a docking device and also showing the hand held data terminal with a modular scanner shown in dashed lines.

Referring to FIGS. 8, 9 and 10, it is noted that the enlarged portion (31) also can contain a battery pack (not shown) or the like for supplying auxiliary power to the hand held terminal (10). This battery pack is also rechargeable.

Referring now to FIGS. 12, 13, 14, 15 and 16, it is noted that the scanner including housing (16) has been removed from the body (11) and has been reattached to a different body member (51) having a keyboard and display device (52) attached thereto. The scanning module (16) shown in FIG. 16 alternatively has a radio frequency antenna (53) attached thereto which is shown in dashed lines in two of the possible position thereof.

Figure 17:
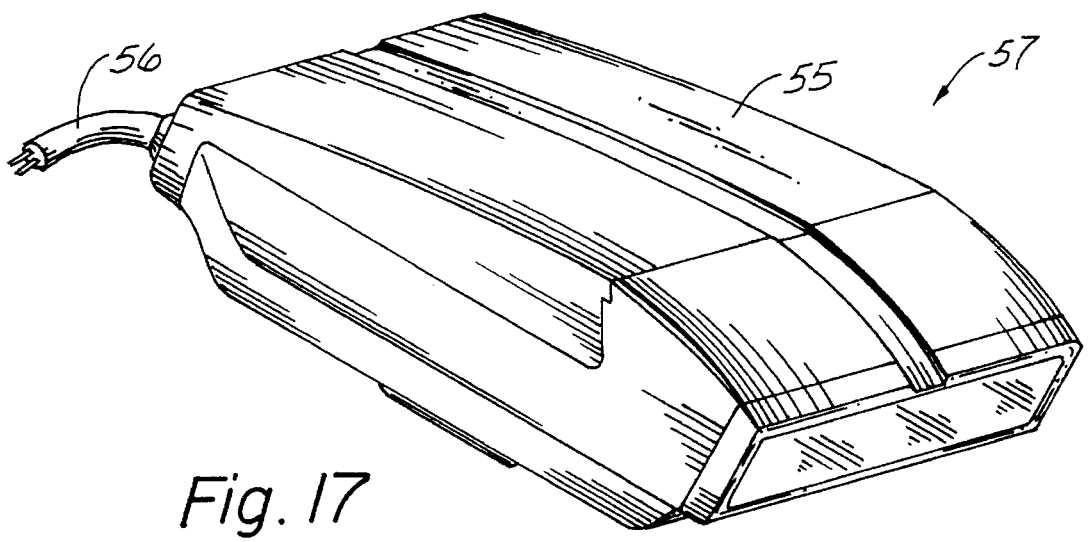
FIG. 17 is a perspective view of a tethered scanner utilizing the modular scanning unit which is also used in the FIG. 1, FIG. 12 embodiments shown herein.
Figure 18:
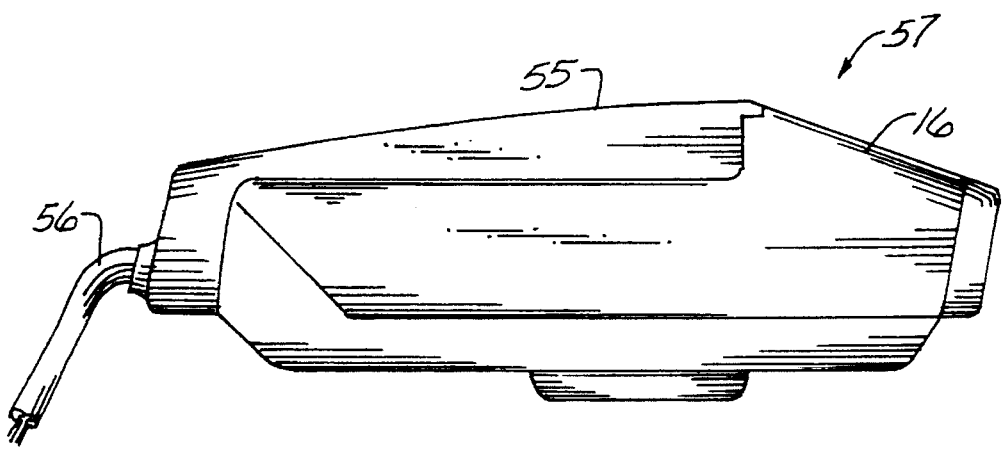
FIG. 18 is a side elevational view of the tethered scanning unit shown in FIG. 16.

Referring now to FIG. 17 and 18, it is noted that the housing (16) which constitutes the scanning module has been removed from the hand held terminal of either FIG. 1 or FIG. 12 and has been reattached to a body member (55) tethered by a cord (56) to a terminal whereby the scanner (57) formed by these members can be used simply as a scanner and not be used necessarily with an integral hand held data terminal.

Figure 19:
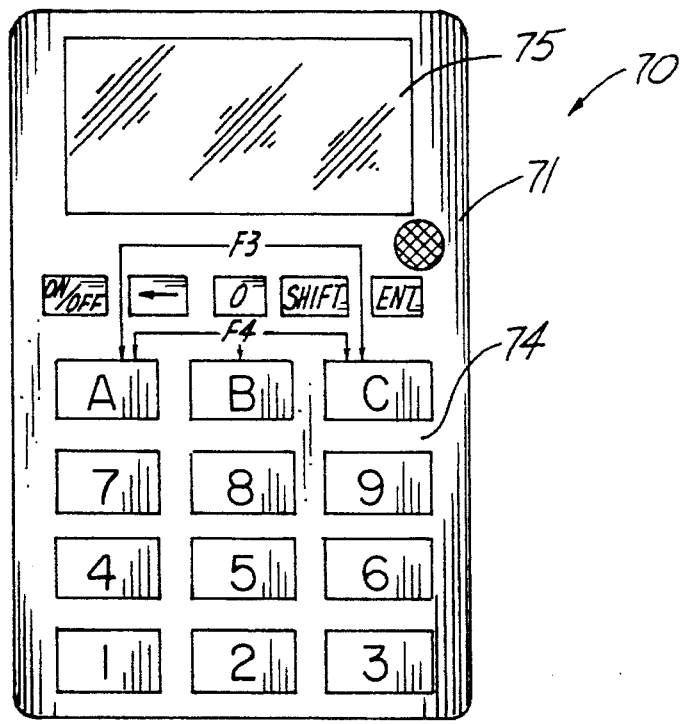
FIG. 19 shows a top plan view of still another hand held data 14 terminal.
Figure 20:
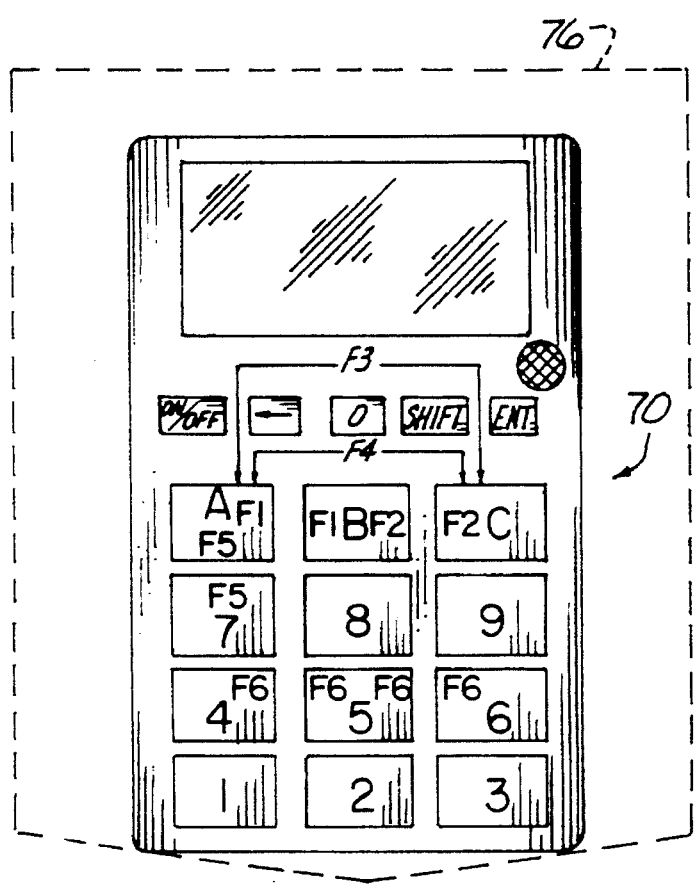
FIG. 20 shows another view of the hand held data terminal and shows how it would fit into a shirt pocket with the shirt pocket being shown in dashed lines of FIG. 20.
Figure 21:
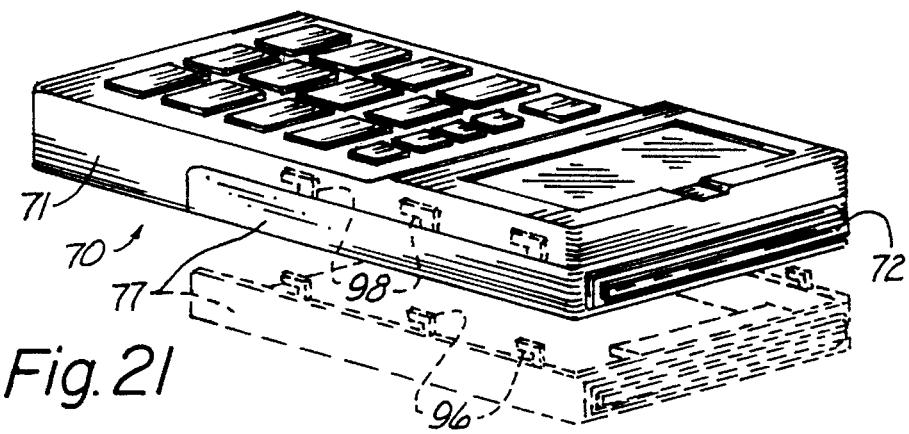
FIG. 21 is a perspective view of the apparatus of FIGS. 19 and 20 showing in dashed lines how the modular scanning unit can be removed therefrom.

FIG. 19 shows another alternative, similar to that shown in the previously filed Cargin U.S. patent application Ser. No. 07/782,931 filed Oct. 25, 1991, which is incorporated herein by reference. A hand held data terminal (70) including, but not limited to, a housing (71), keyboard (74) and display (75) is more rectangular in shape than the hand held terminal of the FIG. 1 embodiment. Additionally, as depicted in FIG. 24A the data terminal (70) could include an integrated or modular scanner (77), FIG 24A, an internal low powered radio transceiver (78) and battery power supply (79). The hand held data terminal (70) is shown in FIG. 20 in combination with a pocket (76) shown in dashed lines in FIG. 20 of a shirt. The hand held data terminal (70) is shown and constructed to be small enough to fit into such pocket (76) of an average size men's dress shirt, the pocket being of a size in the range of 3.5 to 5.5 inches deep and 4 to 5 inches wide. FIG. 21 shows the hand held data terminal (70) with a different modular scanner or optical indicia reader module (77) attached thereto, FIG. 21 showing in dashed lines the scanner before it is attached to the body member or user interface unit (71). The optical indicia reader module (77) has a window or port (72) for receiving light reflected from optical indicia being read. Attachment mechanism (96) can be the same as attachment mechanism (56) shown in U.S. patent application Ser. No. 674,756 filed Mar. 25, 1991, a continuation of which issued on May 17, 1994, as U.S. Pat. No. 5,313,053 which is incorporated herein by reference. Complementary openings (98) in body member user interface unit (71) receive and hold mechanism 21 (96).

Figure 22:
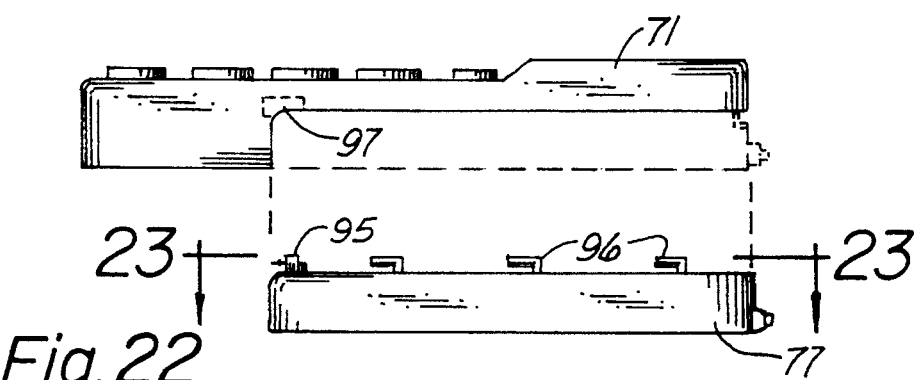
FIG. 22 is a side elevational view of the apparatus of FIG. 19 showing the modular scanning unit removed.

FIG. 22 shows a communication link for electrically connecting the optical indicia reader module to the user interface unit. In this embodiment, pins (95) engage a mating connector (97) for establishing the connection.

Figure 23:
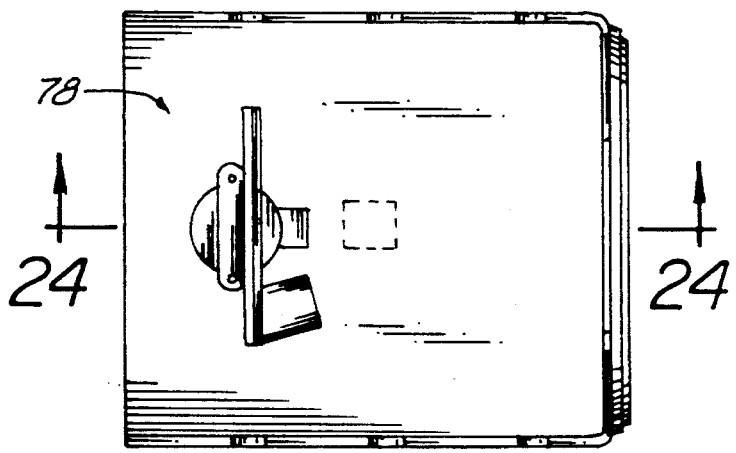
FIG. 23 is a top view of the scanning unit taken along line 22—22 is a top view of an optical indicia reader module with a CCD reader assembly of FIG. 21.
Figure 24:
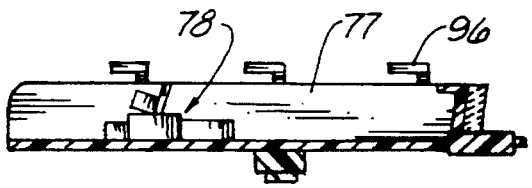
FIG. 24 is a cross sectional view of the scanning unit taken along is a depiction of a user interface unit having a radio transceiver and a battery power supply line 24—24 of FIG. 23.
Figure 23A:
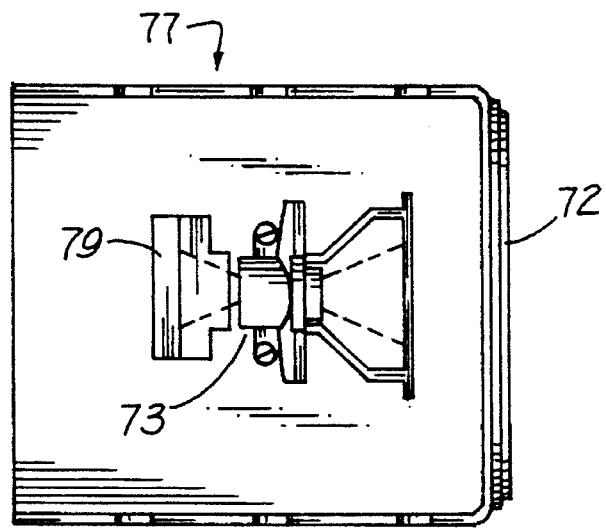
Figure 24A:
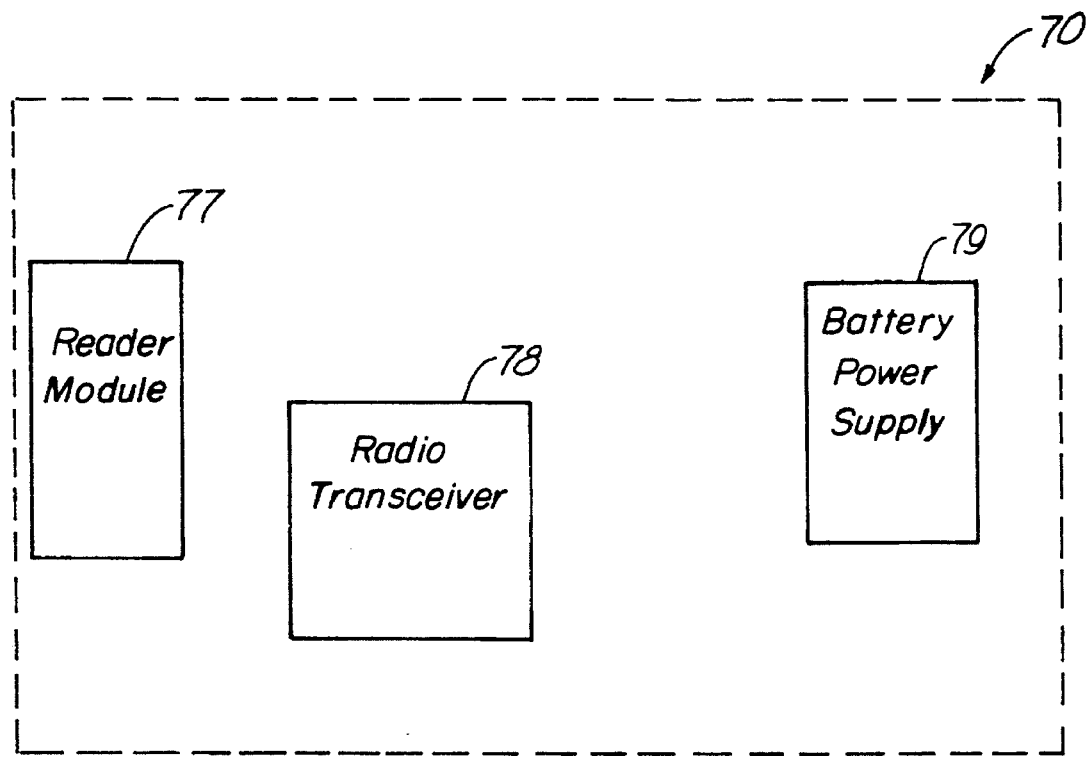
Figure 25:
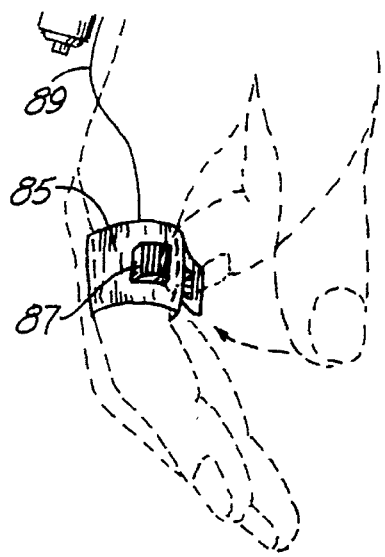
FIG. 25 is a view of a trigger for activating a scanner or the like shown on a hand in dashed lines and which is connected by a wire to the hand held data terminal.
Figure 26:
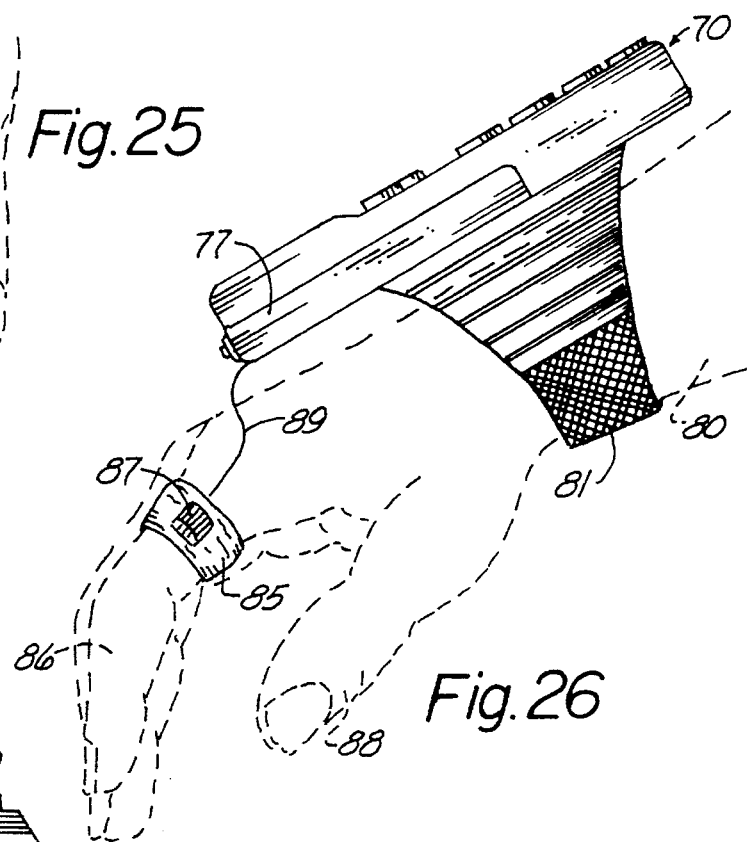
FIG. 26 is a side elevational view of the hand held data terminal of FIG. 18 shown attached to the wrist of a hand and arm with a trigger mechanism attached to one finger of such hand.
Figure 27:
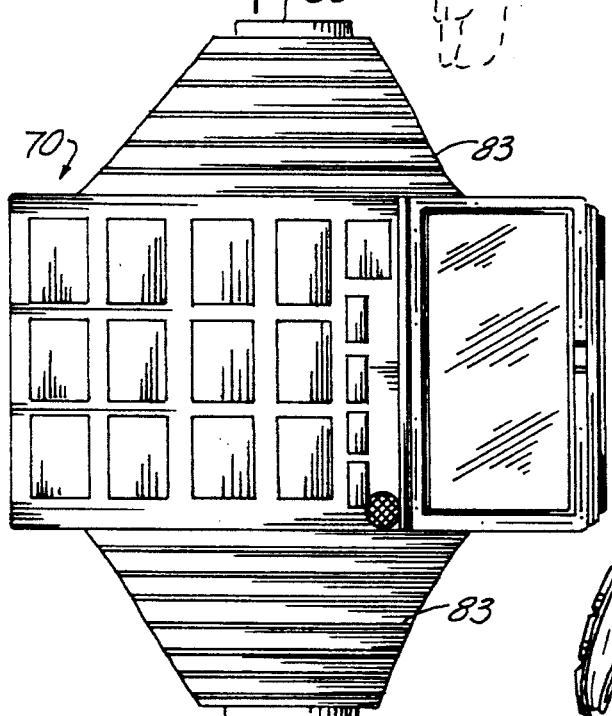
FIG. 27 is a top plan view of the apparatus shown in FIG. 25.

FIGS. 23 and 24 show a laser scanner (78) which forms the engine for the laser scanner disposed within the housing (77). Of course, it is possible to use a CCD scanner instead of the laser scanner (78) if desired. FIG. 23A shows a CCD reader assembly disposed within the optical indicia reader module (77). The CCD reader assemble includes optics and lens system (73) and a photodetector (79).

Figure 28:
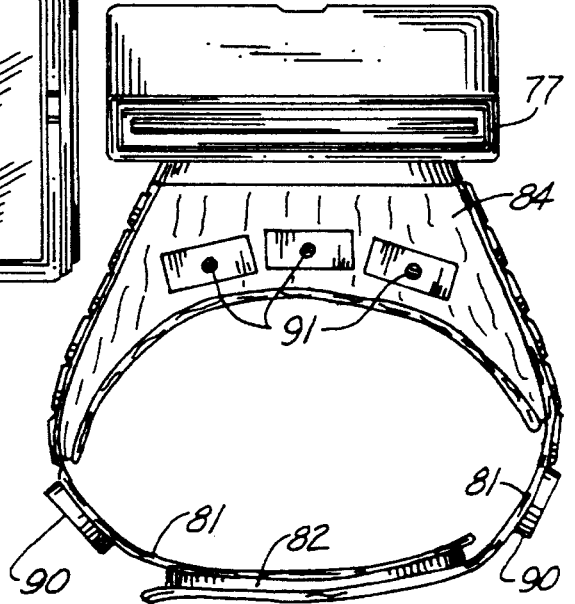
FIG. 28 is a cross sectional view taken along line 27—27 showing how batteries are stored in the structure which attaches the hand held data terminal to the wrist.

Referring now to FIGS. 25–28, it is noted that the hand held data terminal (70) with the laser scanner housing or optical indicia reader module (77) attached thereto is secured to the wrist (80) of the user by a Velcro strap (81) having hook and loop sections (82) disposed thereon as is shown in FIG. 28. The straps (81) are connected to a section (83) having a filler (84), such as foam rubber, for holding rechargeable batteries (91) therein. These rechargeable batteries (91) can either be the primary supply of power for the hand held data terminal (70) or they can provide auxiliary power, either to supplement with or to switch over to in case of power failure within the hand held data terminal (70).

A ring like member (85) is attached to one of the fingers (86) of the hand of the user, although it is to be understood that this ring (85) could go around more than one finger if desired. A trigger (87) on the ring (85) when pushed by the thumb (88), will actuate the scanner within the housing (77). The triggers (90) are wired in parallel with trigger (87). This trigger (87) is connected to the scanner (77) by a cord (89) which leads from the trigger (87) to the scanner (77). Alternatively, triggers (90) on straps (81) as shown in FIG. 28 can be utilized to actuate the scanner within the housing (77).

Referring now to FIG. 29, it is noted that the hand held data terminal (70) with scanner housing (77) attached thereto is attached to the wrist of a user by cloth or elastic straps (92). If these straps are non-elastic, then they will also have Velcro, hook and loop fasteners, similar to the Velcro (82) shown in FIG. 28. Similarly, cloth or elastic straps (93) extend over the palm of the hand shown in dashed lines in FIG. 29 and this connection can also be made by using Velcro if desired. A trigger (94) attached to the strap (93) is wired through a wire in strap (93) (but not shown in FIG. 29) and leads to the scanner within housing (77) such that the thumb (88) of the user can actuate the scanner within housing (77) by pushing on the trigger (94).

Referring to FIG. 30, scanner (100) is a finger mounted device including scanner section (101) which is either a laser scanner or a CCD type scanner for reading a bar code (112) or the like. Housing portion (102) has elastic or Velcro straps (103) and (104) for attaching to a person's finger (105). An on/off switch (106) is provided on housing (102) and function buttons (107), (108) and (109) are provided for various reasons. Typically, the button (107) is thumb-actuated for initiating the scanning of bar code (112). Also, a duplicate number of buttons (107), (108) and (109) are provided on the opposite side of the housing (105) so that it can be readily used by either the right hand or the left hand. The scanner (102) can be connected by cord (110) to a fuller functioning terminal or it can be in radio frequency contact with either a terminal, a printer or a host computer.

Referring now to FIG. 31, an arm or wrist mounted terminal (120) is operably attached by a pair of flexible straps (121) which can be elastic or can be a pair of straps having mated Velcro on the ends thereof. One top surface (122) of the terminal (120) has a display (123) thereon and another surface (124) of the housing terminal (120) has a plurality of keys (125) thereon. This arrangement of having the display at an angle with respect to the buttons (125) permits the display to be easily readable and yet have the buttons easily accessible without the need to be being a contortionist.

Figure 32:
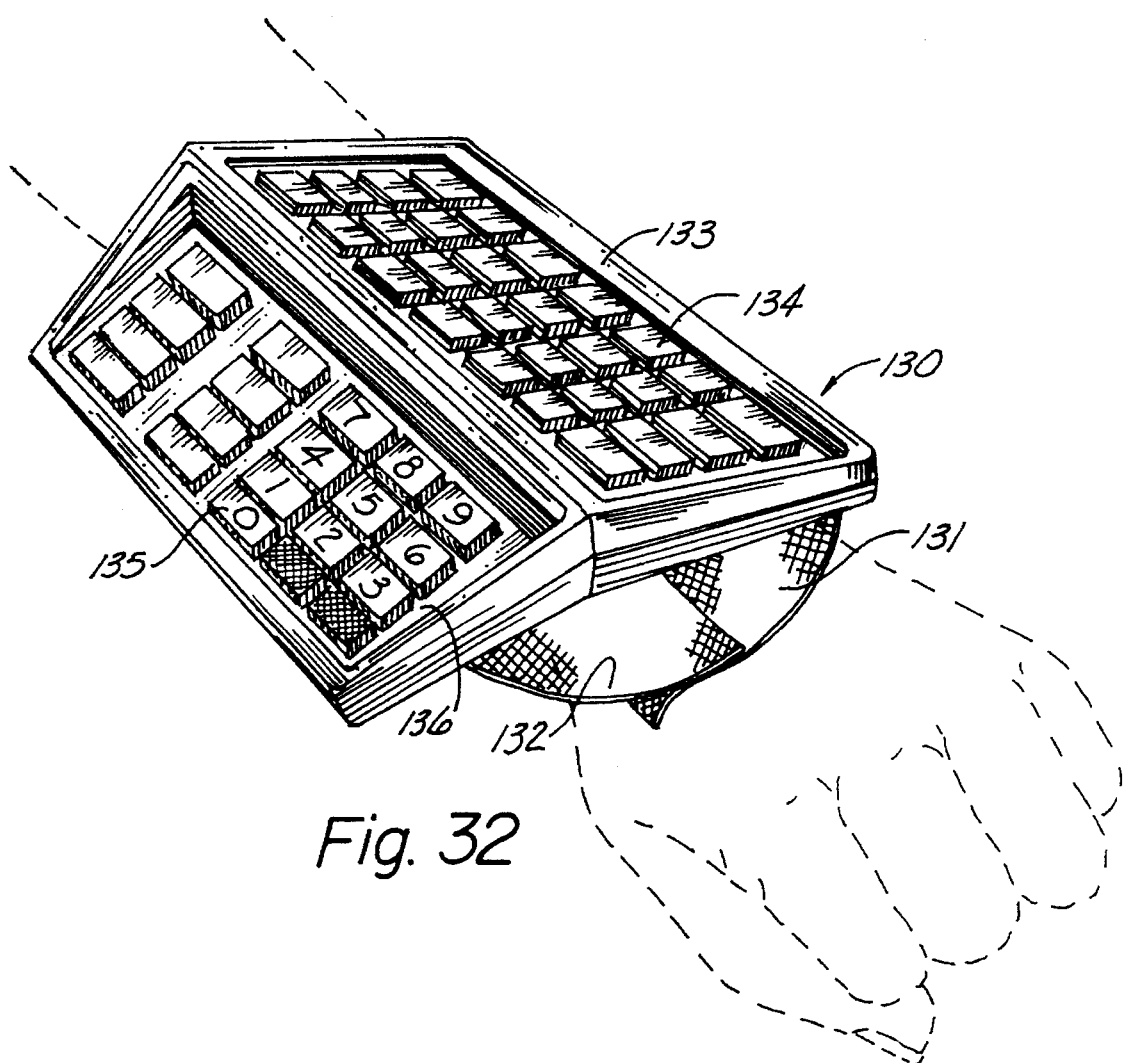
FIG. 32 is a perspective view of another wrist mounted terminal; 22
Figure 33:
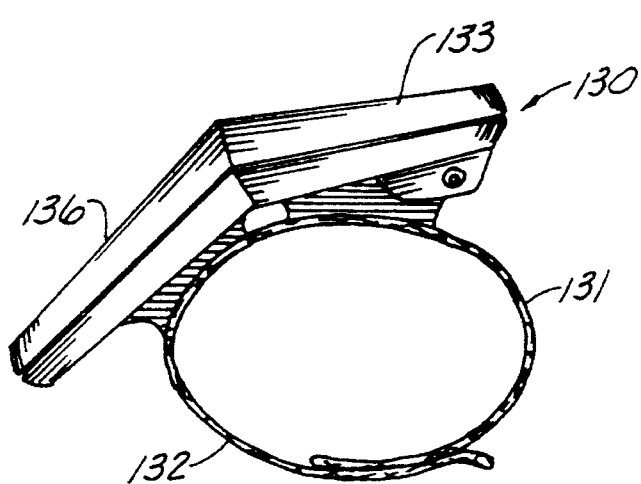
FIG. 33 is a side view of the wrist mounted terminal of FIG. 32.

FIG. 32 shows a wrist or arm mounted terminal (130) having a pair of straps with one side (131) with Velcro on one end and the other mating strap (132) with Velcro thereon so that when they are pressed together in the manner shown in FIG. 33, the device is held onto the wrist, and of course as is well known with Velcro structure, it can easily be released when the terminal (130) is to be removed.

In a fashion similar to the terminal (120), the terminal (130) has a first set of keys (134) mounted on a first surface (133) and a second set of keys (135) mounted on another surface (136) which is disposed at an obtuse angle with respect to the surface (133).

Figure 34:
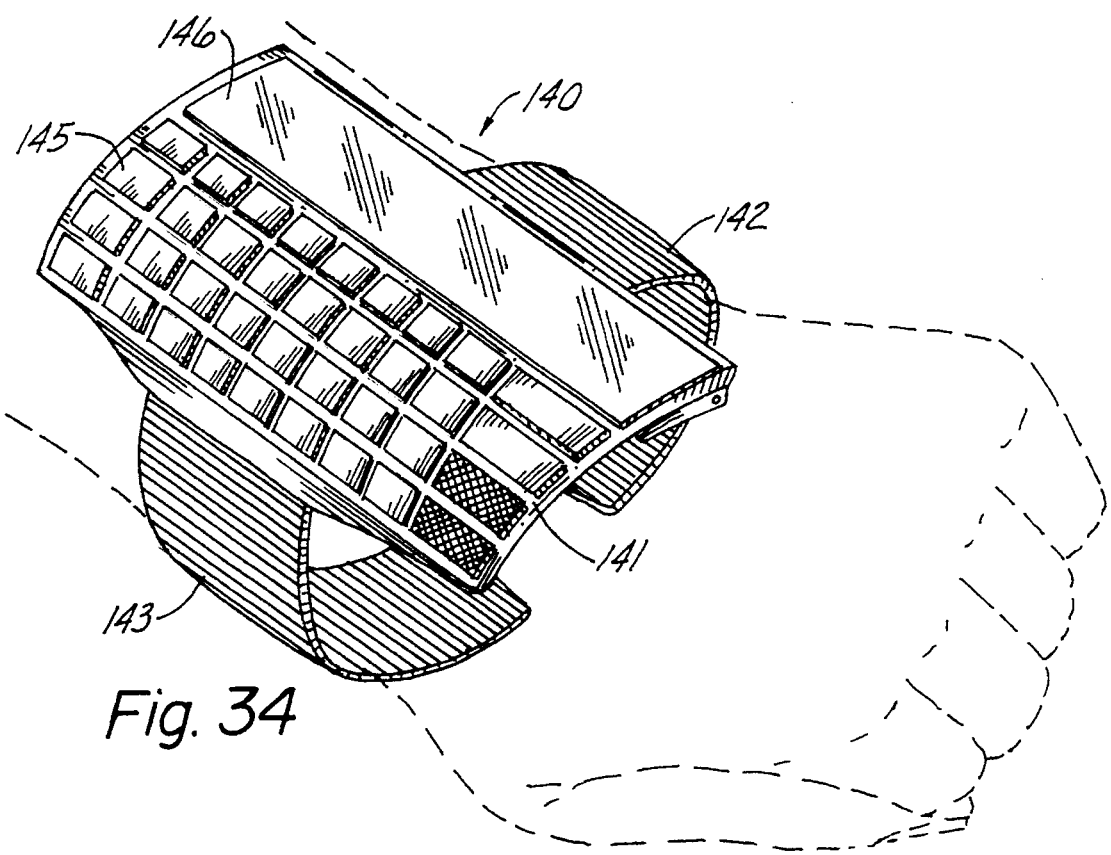
FIG. 34 is a perspective view of a terminal having the keys and display mounted to a flexible frame which will conform to a user's wrist.

Referring now to FIG. 34, a wrist mounted terminal (140) includes a flexible frame (141) which can be of any flexible material but might, for example, be of a flexible polyvinyl chloride with the components of the terminal embedded therein, whereby the terminal body (141) can flex to conform to the shape of the user's wrist or arm when attached by a strap having two flexible portions (142) and (143) affixed to the flexible frame (141). Function buttons (145) can be utilized Just like any other terminal having a rigid housing or frame. A display (146) is also mounted to the flexible frame (141).

Figure 35:
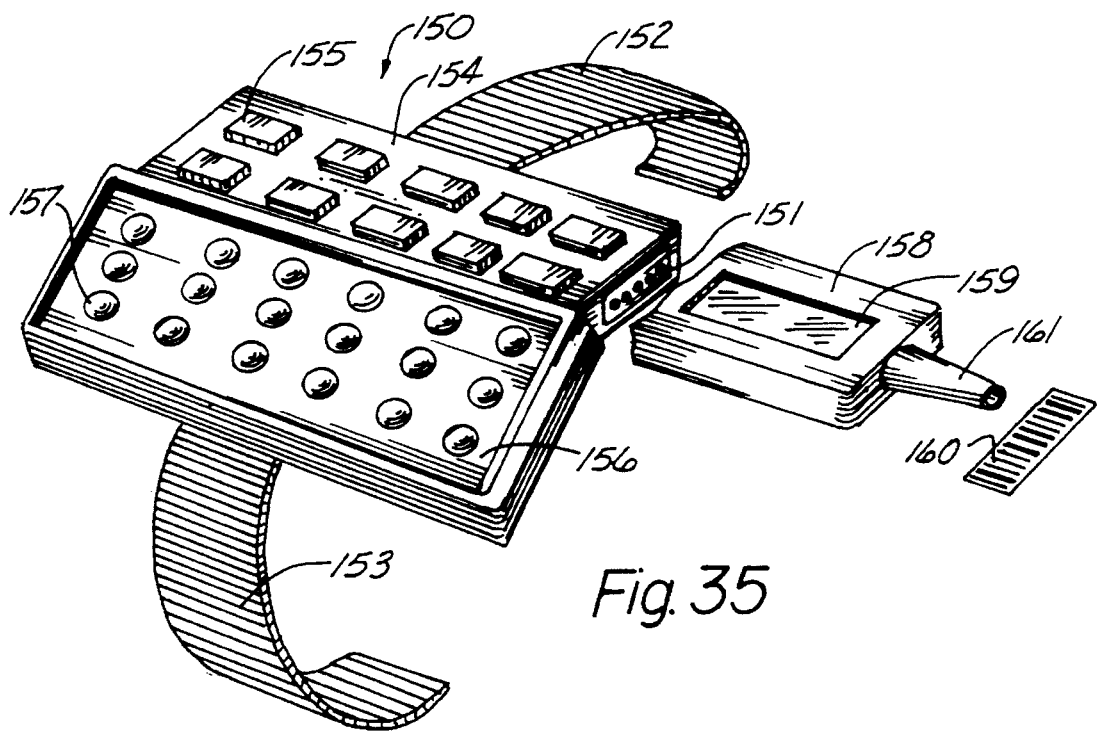
FIG. 35 is a perspective view of a terminal having keys in two planes and a detachable scanner/display all for being worn on the wrist or arm.

Referring now to FIG. 35, terminal (150) is shown having a first strap (152) and a second strap (153) which are interconnectable by Velcro fasteners (not shown). A first housing portion (154) has buttons or keys (155) thereon and a second housing portion (156) has buttons or function keys (157) disposed thereon.

A modular scanner or bar code reader (158) plugs into the portion (154) of terminal (150) and is shown by the plug connector (151). The bar code reader or scanner (158) has a display (159) disposed therein which will read out either what has been scanned or what has been entered by the keys (155) or (157). The bar code (160) can of course be scanned or read using the scanner or reader (158) by moving the arm so that portion (161) of the scanner or reader (158) points toward the bar code (160).

It should be noted that a modular scanner or reader (158) as shown in FIG. 35 could be attached to virtually any of the wrist and hand mounted terminals disclosed in the various embodiments of the present invention. The various terminals accordingly would have the appropriate interface such as the plug connector (151).

Figure 36:
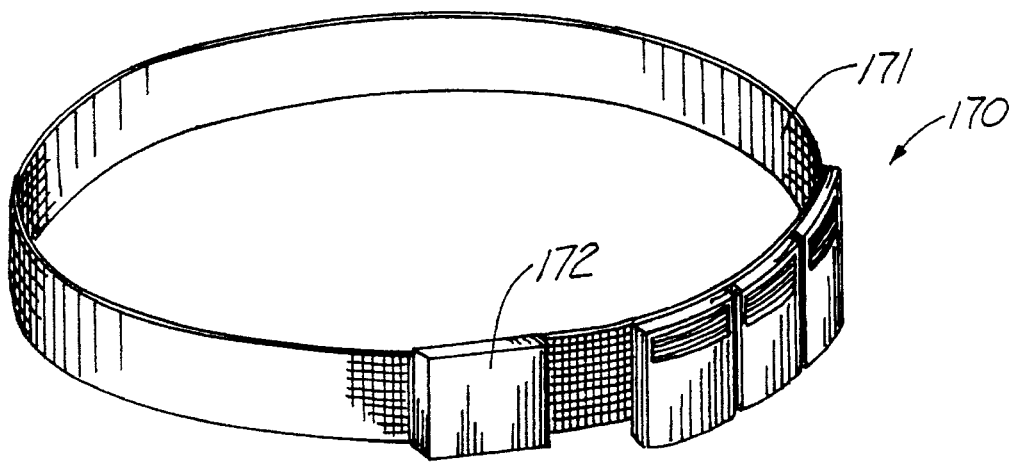
FIG. 36 is a perspective view of a belt mounted modular rechargeable battery pack.
Figure 37:
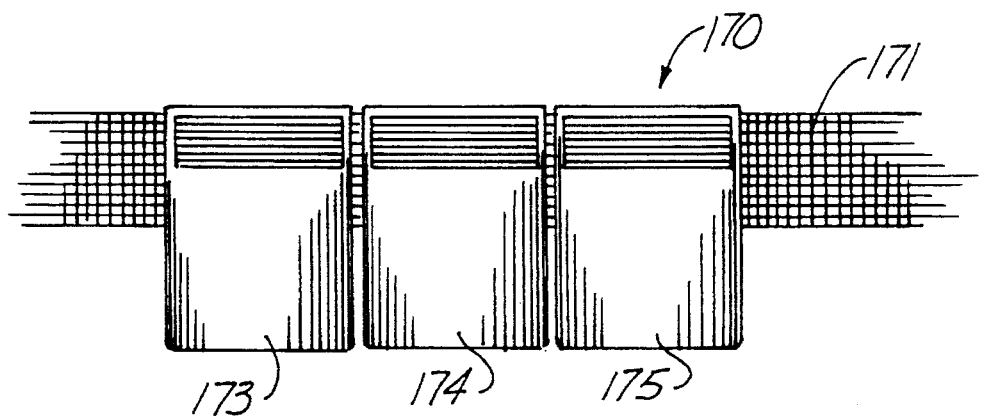
FIG. 37 is a front, enlarged view of the FIG. 36 battery pack.

FIG. 36 shows a plurality of battery packs (170) attached by a belt loop to a belt (171). A conventional belt buckle (172) is also shown. These battery packs (170) are individually referred to as battery packs (173), (174) and (175) and have a flexible interconnect therebetween so that they will conform to the user's belt. A major purpose of the battery pack arrangement (170) is to make the heavier parts of computer terminals, scanners, printers, etc., wearable by the user so that the hand-held terminals, scanners, bar code readers, etc., can be made to be much lighter in weight and therefore, easier to use and producing less fatigue. The flexible battery pack (170) is of course rechargeable and could be mounted on a vest or other wearable apparel.

Referring to FIGS. 38–40, a snap-on battery pack (180) is shown which is also rechargeable and a belt (181) can extend through a loop (182) therein. The device (180) can also include an intelligent computer device and radio frequency communication to a smaller hand-held terminal of lower intelligence (not shown). Function keys (183) are useful for controlling the computer within the modular device (180). This is also for the purpose of putting the heavier weight terminals into a wearable fashion so that the hands of the user are free or only have lighter components, which will prevent fatigue. The devices can be activated by voice or can be a duplex arrangement where the device responds also with a voice message.

Figure 41:
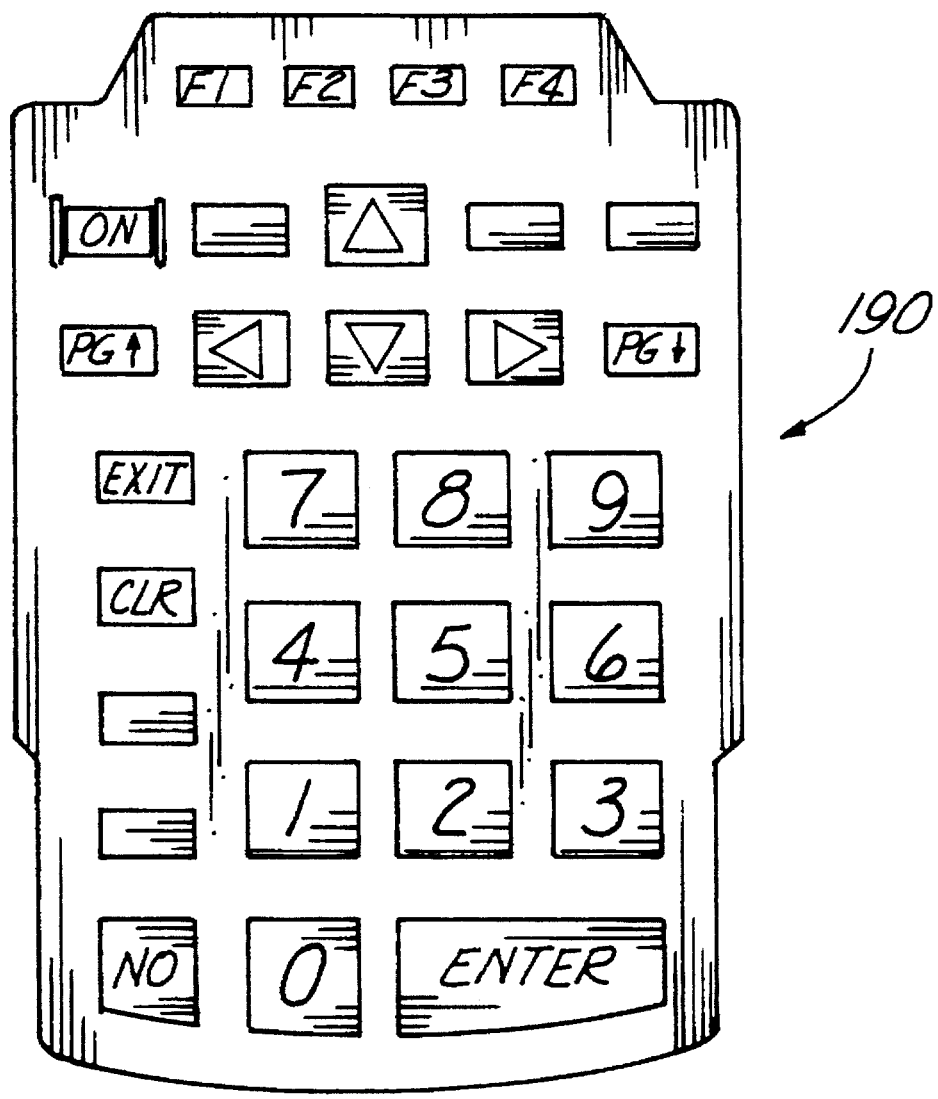
FIG. 41 is a top view of a modular key pad.
Figure 42:
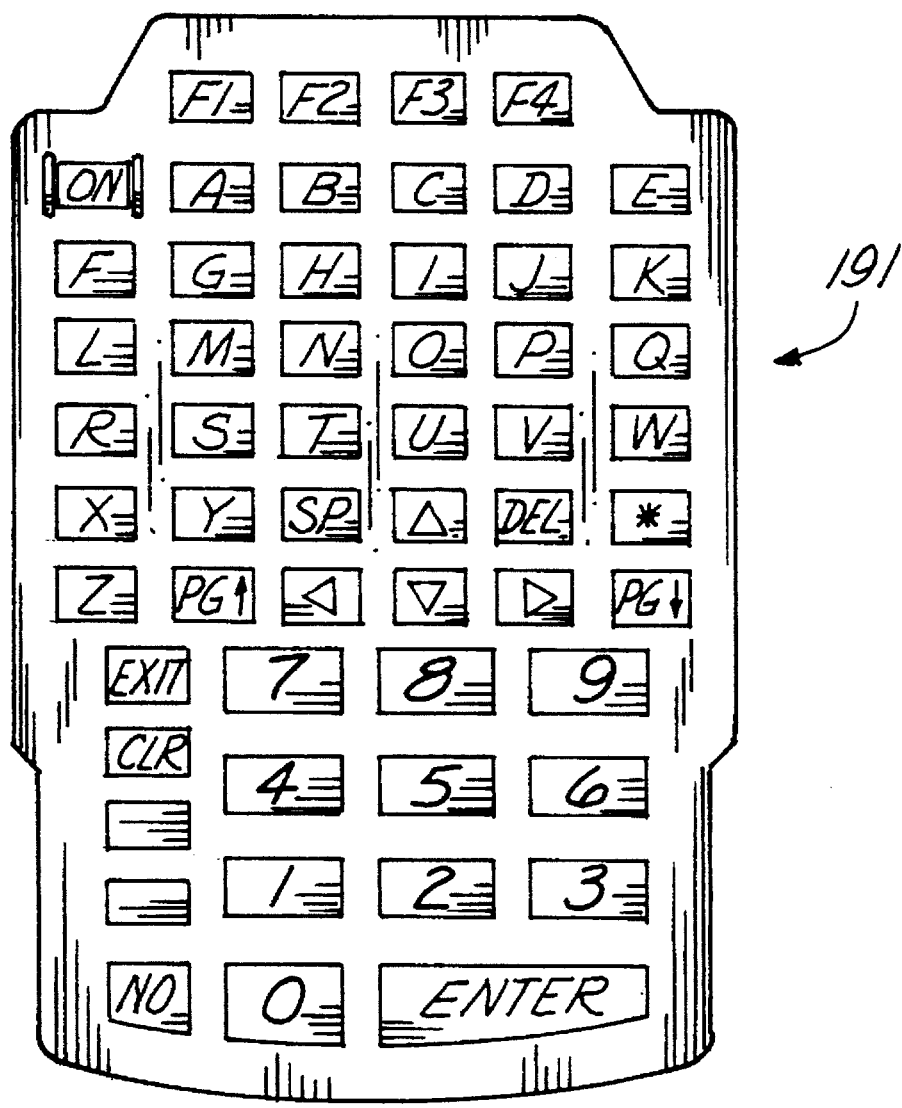
FIG. 42 is a top view of a modular key pad.

Referring now to FIGS. 41 and 42, modular key pads (190 and 191) are shown. In order to increase flexibility of the present invention, the key pad or key board component of the hand held terminal can be made modular such that one key pad can be removed and a different key pad inserted in its place. The modular key pad can be used in conjunction with virtually all of the various disclosed embodiments of the present invention. The hand held terminals would include means for interfacing with the modular key pads as well as means for connecting the modular key pads. The interface could either by electrical, optical or infrared.

Accordingly, it will be appreciated that the objects referred to above are indeed accomplished by use of the embodiments described herein. Obviously, many modifications and variations of the present invention are possible in light of the above teachings. It is therefore to be understood that, within the scope of the appended claims, the invention may be practiced otherwise than as specifically described.

I claim:

1. A body-mounted data acquisition system, comprising:
   (a) a user interface unit for communication with a user;
   (b) an optical indica reader module, operational for communication with said user interface unit, for reading optical indicia located externally of said optical indicia reader module and having a port for receiving light reflected from the optical indicia;
   (c) user interface unit mounting means for securing said user interface unit to the user's body near a wrist and over a forearm of the user; and
   (d) optical indicia reader module mounting means for securing said optical indicia reader module in a position over a top side of a hand of the user, the top side being the side opposite a palm side of the hand, so that the port of said optical indicia reader module is directed over the user's fingers and toward the optical indicia to be read;
   said user interface unit being capable of communication with a variety of different said optical indicia reader modules so that one said optical indicia reader module can be replaced with a different said optical indicia reader module thereby permitting customization of the body-mounted data acquisition system.

2. A body-mounted data acquisition system according to claim 1, further comprising an actuator for activation of said optical indicia reader module of the body-mounted data acquisition system.

3. A body-mounted data acquisition system according to claim 2, wherein said actuator comprises a trigger located on said user interface unit mounting means, for activating said optical indicia reader module when said trigger is pushed by the user.

4. A body-mounted data acquisition system according to claim 1, wherein said user interface unit further comprises a display located so as to be viewable by the user while the body-mounted data acquisition system is operated by the user.

5. A body-mounted data acquisition system according to claim 4, wherein said user interface unit further comprises a keyboard located so as to be usable by the user while the body-mounted data acquisition system is operated by the user.

6. A body-mounted data acquisition system according to claim 5, wherein said display and said keyboard are located in the same plane of said user interface unit.

7. A body-mounted data acquisition system according to claim 1, wherein said user interface unit further comprises a keyboard located so as to be usable by the user while the body-mounted data acquisition system is operated by the user.

8. A body-mounted data acquisition system according to claim 1 wherein said user interface means and said optical indicia reader module, when attached to each other, are of a size capable of being held in an average size men's dress shirt pocket.

9. A body-mounted data acquisition system according to claim 8 wherein said user interface means and said optical indicia reader module, when attached to each other, are of a size capable of being held in a pocket in the range of 3.5 to 5.5 inches deep and 4 to 5 inches wide.

10. A body-mounted data acquisition system according to claim 1 wherein said user interface unit further comprises a radio frequency transceiver disposed at least partially in said body means for receiving and transmitting information.

11. A body-mounted data acquisition system according to claim 1 wherein said optical indicia reader module is a laser scanner.

12. A body-mounted data acquisition system according to claim 1 wherein said optical indicia reader module is a CCD type reader.

13. A body-mounted data acquisition system, comprising:
   (a) a user interface unit for communication with a user;
   (b) an optical indicia reader module, operational for communication with said user interface unit, for reading optical indicia located externally of said optical indicia reader module and having a port for receiving light reflected from the optical indicia;
   (c) user interface unit mounting means for securing said user interface unit to the user's body near a wrist and over a forearm of the user; and
   (d) optical indicia reader module mounting means for securing said optical indicia reader module in a position over a top side of a hand of the user, the top side being the side opposite a palm side of the hand so that the port of said optical indicia reader module is directed over the user's fingers and toward the optical indicia to be read;
   the port of said optical indicia reader module being positioned nearer a hand of the user and said user interface unit being positioned farther from the hand, of the user and between the port and an elbow of the user, when the body-mounted data acquisition system is attached to the user's body for data acquisition.

14. A body-mounted data acquisition system according to claim 13, further comprising an actuator for activation of said optical indicia reader module of the body-mounted data acquisition system.

15. A body-mounted data acquisition system according to claim 14, wherein said actuator comprises a trigger located on said user interface unit mounting means, for activating said optical indicia reader module when said trigger is pushed by the user.

16. A body-mounted data acquisition system according to claim 13, wherein said user interface unit further comprises a display located so as to be viewable by the user while the body-mounted data acquisition system is operated by the user.

17. A body-mounted data acquisition system according to claim 13, wherein said user interface unit further comprises a keyboard located so as to be usable by the user while the body-mounted data acquisition system is operated by the user.

18. A body-mounted data acquisition system according to claim 16, wherein said user interface unit further comprises a keyboard located so as to be usable by the user while the body-mounted data acquisition system is operated by the user.

19. A body-mounted data acquisition system according to claim 18, wherein said display and said keyboard are located in the same plane of said user interface unit.

20. A body-mounted data acquisition system according to claim 13, wherein said user interface means and said optical indicia reader module, when attached to each other, are of a size capable of being held in an average size men's dress shirt pocket.

21. A body-mounted data acquisition system according to claim 20 wherein said user interface means and said optical indicia reader module, when attached to each other, are of a size capable of being held in a pocket in the range of 3.5 to 5.5 inches deep and 4 to 5 inches wide.

22. A body-mounted data acquisition system according to claim 13 wherein said user interface unit further comprises a radio frequency transceiver disposed at least partially in said body means for receiving and transmitting information.

23. A body-mounted data acquisition system according to claim 13 wherein said optical indicia reader module is a laser scanner.

24. A body-mounted data acquisition system according to claim 13 wherein said optical indicia reader module is a CCD type reader.

25. Apparatus comprising:
 (a) body means for receiving, storing and transmitting information, said body means having a top portion, a bottom portion, a forward end, a rear end and a longitudinal axis;
 (b) key means disposed in said top portion for manually entering information into said body means;
 (c) display means disposed in said top portion for displaying information;
 (d) scanning means for optically reading information and for communicating the optically read information to said body means;
 (e) housing means for holding said scanning means;
 (f) means for selectively and operatively attaching and detaching said housing means to said body means in juxtaposition to the forward end of said body means; and
 (g) means for operatively attaching said housing means and said body means to a user's wrist.

26. The apparatus of claim 25 further including a radio frequency transceiver means disposed at least partially in said body means for receiving and transmitting information between said body means and a base radio transceiver.

27. The apparatus of claim 25 further including means comprising the external portions of said body means and said housing means when said body means and said housing means are connected together for permitting said body means and said housing means to be held in an average size men's dress shirt pocket whereby a user can store said apparatus in such a shirt pocket.

28. The apparatus of claim 27 in combination with a shirt having a pocket in the range of 3.5 to 5.5 inches deep and 4 to 5 inches wide.

29. The apparatus of claim 25 wherein said wrist attaching means includes battery means for supplying electrical power to said body means.

30. The apparatus of claim 29 further including means for actuating said scanning means with the hand that is attached to the wrist disposed within said wrist attaching means.

31. The apparatus of claim 30 further including means for attaching said scanning actuating means to at least one of the fingers on said hand.

32. The apparatus of claim 31 wherein said attaching means includes means for holding said actuating means where it can be actuated by the thumb of said hand.

33. The apparatus of claim 29 wherein said battery means provides a primary power source for said body means.

34. The apparatus of claim 29 wherein said battery means provides a supplemental power source for said body means.

35. The apparatus of claim 25 further including means for also attaching said housing means to the back of a user's hand.

36. The apparatus of claim 35 further including means connected to said hand attaching means for actuating said scanning means disposed within reach of the thumb of said hand.

37. A body-mounted data acquisition system, comprising:
 (a) a user interface unit for communication with a user;
 (b) an optical indicia reader module, operational for communication with said user interface unit, for reading optical indicia located externally of said optical indicia reader module and having a port for receiving light reflected from the optical indicia;
 (c) a user interface unit mounting device for securing said user interface unit to the user's body near a wrist and over a forearm of the user; and
 (d) an optical indicia reader module mounting device for securing said optical indicia reader module to said user interface unit in a position over a top side of a hand of the user, the top side being the side opposite a palm side of the hand, so that the port of said optical indicia reader module is directed over the user's fingers and toward the optical indicia to be read;
said user interface unit being capable of communication with a variety of different said optical indicia reader modules so that one said optical indicia reader module can be replaced with a different said optical indicia reader module thereby permitting customization of the body-mounted data acquisition system.

38. A body-mounted data acquisition system according to claim 37, wherein said user interface unit is capable of being detached from said user interface unit mounting device by the user.

39. A body-mounted data acquisition system according to claim 37, further comprising an actuator for activation of said optical indicia reader module of the body-mounted data acquisition system.

40. A body-mounted data acquisition system according to claim 39, wherein said actuator comprises a trigger located on said user interface unit mounting device, for activating said optical indicia reader module when said trigger is pushed by the user.

41. A body-mounted data acquisition system according to claim 39, wherein said actuator comprises:
 (a) a ring member for receiving at least one finger of the user;
 (b) a trigger, located on said ring, for activating said optical indicia reader module when said trigger is pushed by a thumb of the user; and (c) an insulated wire, connecting said optical indicia reader module to said trigger, for carrying an activation signal to said optical indicia reader module.

42. A body-mounted data acquisition system according to claim 37, wherein said user interface unit and said optical indicia reader module, when connected, are of a size suitable for storage together in a shirt pocket when the body-mounted data acquisition system is not in use and when said user interface unit mounting device has been detached from said user interface unit.

43. A body-mounted data acquisition system according to claim 37, wherein said user interface unit further comprises a display located so as to be viewable by the user while the body-mounted data acquisition system is operated by the user.

44. A body-mounted data acquisition system according to claim 43, wherein said user interface unit further comprises a keyboard located so as to be usable by the user while the body-mounted data acquisition system is operated by the user.

45. A body-mounted data acquisition system according to claim 44, wherein said display and said keyboard are located in the same plane of said user interface unit.

46. A body-mounted data acquisition system according to claim 37, wherein said user interface unit further comprises a keyboard located so as to be usable by the user while the body-mounted data acquisition system is operated by the user.

47. A body-mounted data acquisition system according to claim 37, wherein said optical indicia reader module is a laser scanner.

48. A body-mounted data acquisition system according to claim 37 wherein said optical indicia reader module is a CCD type reader.

49. A body-mounted data acquisition system according to claim 37, wherein said user interface unit mounting means further comprises a receptacle for receiving a battery for supplying battery power to said user interface unit when said user interface unit is attached to said user interface unit mounting means.

50. A body-mounted data acquisition system according to claim 49, wherein the battery power supplied to said user interlace unit is the body-mounted data acquisition system's primary source of power.

51. A body-mounted data acquisition system according to claim 49, wherein the battery power supplied to said user interface unit is a supplemental source of power for the body-mounted data acquisition system.

52. A body-mounted data acquisition system, comprising:
(a) a user interface unit for communication with a user;
(b) an optical indicia reader module, operational for communication with said user interface unit, for reading optical indicia located externally of said optical indicia reader module and having a port for receiving light reflected from the optical indicia;
(c) a user interface unit mounting device for securing said user interface unit to the user's body near a wrist and over a forearm of the user; and
(d) an optical indicia reader module mounting device for securing said optical indicia reader module to said user interface unit in a position over a top side of a hand of the user, the top side being the side opposite a palm side of the hand, so that the port of said optical indicia reader module is directed over the user's fingers and toward the optical indicia to be read; the port of said optical indicia reader module being positioned nearer a hand of the user, and said user interface unit being positioned farther from the hand of the user and between the port and an elbow of the user, when the body-mounted data acquisition system is attached to the user's body for data acquisition.

53. A body-mounted data acquisition system according to claim 52, wherein said user interface unit is capable of being detached from said user interface unit mounting device by the user.

54. A body-mounted data acquisition system according to claim 52, further comprising an actuator for activation of said optical indicia reader module of the body-mounted data acquisition system.

55. A body-mounted data acquisition system according to claim 54, wherein said actuator comprises a trigger located on said user interface unit mounting device, for activating said optical indicia reader module when said trigger is pushed by the user.

56. A body-mounted data acquisition system according to claim 54, wherein said actuator comprises:
(a) a ring member for receiving at least one finger of the user;
(b) a trigger, located on said ring, for activating said optical indicia reader module when said trigger is pushed by a thumb of the user; and
(c) an insulated wire, connecting said optical indicia reader module to said trigger, for carrying an activation signal to said optical indicia reader module.

57. A body-mounted data acquisition system according to claim 52, wherein said user interface unit and said optical indicia reader module, when connected, are of a size suitable for storage together in a shirt pocket when the body-mounted data acquisition system is not in use and when said user interface unit mounting device has been detached from said user interface unit.

58. A body-mounted data acquisition system according to claim 52, wherein said user interface unit further comprises a display located so as to be viewable by the user while the body-mounted data acquisition system is operated by the user.

59. A body-mounted data acquisition system according to claim 58, wherein said user interface unit further comprises a keyboard located so as to be usable by the user while the body-mounted data acquisition system is operated by the user.

60. A body-mounted data acquisition system according to claim 59, wherein said display and said keyboard are located in the same plane of said user interface unit.

61. A body-mounted data acquisition system according to claim 52, wherein said user interface unit further comprises a keyboard located so as to be usable by the user while the body-mounted data acquisition system is operated by the user.

62. A body-mounted data acquisition system according to claim 52 wherein said user interface means and said optical indicia reader module, when attached to each other, are of a size capable of being held in an average size men's dress shirt pocket.

63. A body-mounted data acquisition system according to claim 62 wherein said user interface means and said optical indicia reader module, when attached to each other, are of a size capable of being held in a pocket in the range of 3.5 to 5.5 inches deep and 4 to 5 inches wide.

64. A body-mounted data acquisition system according to claim 52 wherein said user interface unit further comprises a radio frequency transceiver disposed at least partially in said body means for receiving and transmitting information.

65. A body-mounted data acquisition system according to claim 52 wherein said optical indicia reader module is a laser scanner.

66. A body-mounted data acquisition system according to claim 52 wherein said optical indicia reader module is a CCD type reader.

67. A body-mounted data acquisition system according to claim 52, wherein said user interface unit mounting means further comprises a receptacle for receiving a battery for supplying battery power to said user interface unit when said user interface unit is attached to said user interface unit mounting means.

68. A body-mounted data acquisition system according to claim 67, wherein the battery power supplied to said user interface unit is the body-mounted data acquisition system's primary source of power.

69. A body-mounted data acquisition system according to claim 67, wherein the battery power supplied to said user interface unit is a supplemental source of power for the body-mounted data acquisition system.

70. A body-mounted data acquisition system, comprising:
 (a) a user interface unit for communication with a user;
 (b) an optical indicia reader module, operational for communication with said user interface unit, for reading optical indicia located externally of said optical indicia reader module and having a port for receiving light reflected from the optical indicia;
 (c) a user interface unit mounting device for securing said user interface unit to the user's body near a wrist and over a forearm of the user; and
 (d) said optical indicia reader module being positioned over a top side of a hand of the user, the top side being the side opposite a palm side of the hand, so that the port of said optical indicia
 reader module is directed over the user's fingers and toward the
 optical indicia to be read;
said user interface unit being capable of communication with a variety of different said optical indicia reader modules so that one said optical indicia reader module can be replaced with a different said optical indicia reader module thereby permitting customization of the body-mounted data acquisition system.

71. A body-mounted data acquisition system according to claim 70, wherein said user interface unit is capable of being detached from said user interface unit mounting device by the user.

72. A body-mounted data acquisition system according to claim 70, further comprising an actuator for activation of said optical indicia reader module of the body-mounted data acquisition system.

73. A body-mounted data acquisition system according to claim 72, wherein said actuator comprises a trigger located on said user interface unit mounting device, for activating said optical indicia reader module when said trigger is pushed by the user.

74. A body-mounted data acquisition system according to claim 72, wherein said actuator comprises:
 (a) a ring member for receiving at least one finger of the user;
 (b) a trigger, located on said ring, for activating said optical indicia reader module when said trigger is pushed by a thumb of the user; and
 (c) an insulated wire, connecting said optical indicia reader module to said trigger, for carrying an activation signal to said optical indicia reader module.

75. A body-mounted data acquisition system according to claim 70, wherein said user interface unit and said optical indicia reader module are of a size suitable for storage together in a shirt pocket when the body-mounted data acquisition system is not in use and when said user interface unit mounting device has been detached from said user interface unit.

76. A body-mounted data acquisition system according to claim 70, wherein said user interface unit further comprises a display located so as to be viewable by the user while the body-mounted data acquisition system is operated by the user.

77. A body-mounted data acquisition system according to claim 76, wherein said user interface unit further comprises a keyboard located so as to be usable by the user while the body-mounted data acquisition system is operated by the user.

78. A body-mounted data acquisition system according to claim 77, wherein said display and said keyboard are located in the same plane of said user interface unit.

79. A body-mounted data acquisition system according to claim 70, wherein said user interface unit further comprises a keyboard located so as to be usable by the user while the body-mounted data acquisition system is operated by the user.

80. A body-mounted data acquisition system according to claim 70 wherein said optical indicia reader module is a laser scanner.

81. A body-mounted data acquisition system according to claim 70 wherein said optical indicia reader module is a CCD type reader.

82. A body-mounted data acquisition system according to claim 70, wherein said user interface unit mounting means further comprises a receptacle for receiving a battery for supplying battery power to said user interface unit when said user interface unit is attached to said user interface unit mounting means.

83. A body-mounted data acquisition system according to claim 82, wherein the battery power supplied to said user interface unit is the body-mounted data acquisition system's primary source of power.

84. A body-mounted data acquisition system according to claim 82, wherein the battery power supplied to said user interface unit is a supplemental source of power for the body-mounted data acquisition system.

85. A body-mounted data acquisition system, comprising:
 (a) a user interface unit for communication with a user;
 (b) an optical indicia reader module, operational for communication with said user interface unit, for reading optical indicia located externally of said optical indicia reader module and having a port for receiving light reflected from the optical indicia;
 (c) a user interface unit mounting device for securing said user interface unit to the user's body near a wrist and over a forearm of the user; and
 (d) wherein said optical indicia reader module is positioned over a top side of a hand of the user, the top side being the side opposite a palm side of the hand, so that the port of said optical indicia reader module is directed over the user's fingers and toward the optical indicia to be read;
the port of said optical indicia reader module being positioned nearer a hand of the user, and said user interface unit being positioned farther from the hand of the user and between the port and an elbow of the user, when the body-mounted data acquisition system is attached to the user's body for data acquisition.

86. A body-mounted data acquisition system according to claim 85, wherein said user interface unit is capable of being detached from said user interface unit mounting device by the user.

87. A body-mounted data acquisition system according to claim 85, further comprising an actuator for activation of said optical indicia reader module of the body-mounted data acquisition system.

88. A body-mounted data acquisition system according to claim 87, wherein said actuator comprises a trigger located on said user interface unit mounting device, for activating said optical indicia reader module when said trigger is pushed by the user.

89. A body-mounted data acquisition system according to claim 87, wherein said actuator comprises:
   (a) a ring member for receiving at least one finger of the user;
   (b) a trigger, located on said ring, for activating said optical indicia reader module when said trigger is pushed by a thumb of the user: and
   (c) an insulated wire, connecting said optical indicia reader module to said trigger, for carrying an activation signal to said optical indicia reader module.

90. A body-mounted data acquisition system according to claim 85, wherein said user interface unit and said optical indicia reader module are of a size suitable for storage together in a shirt pocket when the body-mounted data acquisition system is not in use and when said user interface unit mounting device has been detached from said user interface unit.

91. A body-mounted data acquisition system according to claim 85, wherein said user interface unit further comprises a display located so as to be viewable by the user while the body-mounted data acquisition system is operated by the user.

92. A body-mounted data acquisition system according to claim 91, wherein said user interface unit further comprises a keyboard located so as to be usable by the user while the body-mounted data acquisition system is operated by the user.

93. A body-mounted data acquisition system according to claim 92, wherein said display and said keyboard are located in the same plane of said user interface unit.

94. A body-mounted data acquisition system according to claim 85, wherein said user interface unit further comprises a keyboard located so as to be usable by the user while the body-mounted data acquisition system is operated by the user.

95. A body-mounted data acquisition system according to claim 85 wherein said user interface means and said optical indicia reader module are of a size capable of being held together in an average size men's dress shirt pocket.

96. A body-mounted data acquisition system according to claim 95 wherein said user interface means and said optical indicia reader module, when attached to each other, are of a size capable of being held in a pocket in the range of 3.5 to 5.5 inches deep and 4 to 5 inches wide.

97. A body-mounted data acquisition system according to claim 85 wherein said user interface unit further comprises a radio frequency transceiver disposed at least partially in said body means for receiving and transmitting information.

98. A body-mounted data acquisition system according to claim 85 wherein said optical indicia reader module is a laser scanner.

99. A body-mounted data acquisition system according to claim 85 wherein said optical indicia reader module is a CCD type reader.

100. A body-mounted data acquisition system according to claim 85, wherein said user interface unit mounting means further comprises a receptacle for receiving a battery for supplying battery power to said user interface unit when said user interface unit is attached to said user interface unit mounting means.

101. A body-mounted data acquisition system according to claim 100, wherein the battery power supplied to said user interface unit is the body-mounted data acquisition system's primary source of power.

102. A body-mounted data acquisition system according to claim 100, wherein the battery power supplied to said user interface unit is a supplemental source of power for the body-mounted data acquisition system.

* * * * *